(12) United States Patent  
Turnquist et al.

(10) Patent No.: US 12,529,239 B2  
(45) Date of Patent: Jan. 20, 2026

(54) WIND TURBINE TOWER STRUCTURE WITH STACKED TOWER SECTIONS

(71) Applicant: General Electric Company, Schenectady, NY (US)

(72) Inventors: Norman Arnold Turnquist, Carlisle, NY (US); Christopher James Kenny, Schoharie, NY (US); Xiaopeng Li, Niskayuna, NY (US); Gregory Edward Cooper, Greenfield Center, NY (US); Biao Fang, Clifton Park, NY (US); Pascal Meyer, Burnt Hills, NY (US); Collin Mckee Sheppard, Greenville, SC (US); Ryan Eric Vogel, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 368 days.

(21) Appl. No.: 17/977,374

(22) Filed: Oct. 31, 2022

(65) Prior Publication Data

US 2024/0141674 A1    May 2, 2024

(51) Int. Cl.
  *E04H 12/34*    (2006.01)
  *B28B 1/00*    (2006.01)
  (Continued)

(52) U.S. Cl.
  CPC ............ *E04H 12/342* (2013.01); *B28B 1/001* (2013.01); *B33Y 80/00* (2014.12); *E04G 21/142* (2013.01);
  (Continued)

(58) Field of Classification Search
  CPC ......... E04H 12/12; E04H 12/26; E04H 12/34; E04H 12/341; E04H 12/342;
  (Continued)

(56) References Cited

U.S. PATENT DOCUMENTS 4,272,929 A * 6/1981 Hanson ................. E02D 27/425  
                                                                               52/745.18  
7,694,473 B2    4/2010 Jakubowski et al.  
(Continued)

FOREIGN PATENT DOCUMENTS

CN        103331817 A     10/2013  
CN        105793504 A     7/2016  
(Continued)

OTHER PUBLICATIONS

European Search Report EP23207125 on Apr. 26, 2024.  
(Continued)

*Primary Examiner* — Kyle J. Walraed-Sullivan  
(74) *Attorney, Agent, or Firm* — Dority & Manning, P.A.

(57) ABSTRACT

The present disclosure is directed to embodiments of a tower structure with at least partially additively manufactured, stacked tower sections. Embodiments of the tower structure have a plurality of stacked tower sections, wherein at least one tower section of the plurality of stacked tower sections includes a wall element having one or more printed layers, and a base holding thereon the one or more printed layers. The present disclosure also is directed to a method of manufacturing a tower structure using a stacked tower sections and additive manufacturing. Embodiments of the method include forming a base of poured concrete or cast material, printing and depositing one or more printed layers to form a wall element, and stacking the plurality of tower sections to form the tower structure.

19 Claims, 20 Drawing Sheets

(51) Int. Cl.
  *B33Y 80/00* (2015.01)
  *E04G 21/14* (2006.01)
  *E04H 12/12* (2006.01)
  *F03D 13/20* (2016.01)

(52) U.S. Cl.
  CPC ........... *E04H 12/12* (2013.01); *E04H 12/341* (2013.01); *F03D 13/20* (2016.05)

(58) Field of Classification Search
  CPC ... E04H 12/344; F03D 13/20; F03D 13/2005; F03D 13/201; F03D 13/204; F03D 13/205; F03D 13/206; F03D 13/22; B33Y 80/00; E04G 21/142
  See application file for complete search history.

(56) References Cited

U.S. PATENT DOCUMENTS

| | | |
|---|---|---|
| 7,739,843 B2 | 6/2010 | Cortina-Cordero |
| 8,220,212 B2 | 7/2012 | Stiesdal |
| 8,297,025 B2 | 10/2012 | Huynh Tuong et al. |
| 8,555,600 B2 | 10/2013 | Cortina-Cordero et al. |
| 8,919,074 B2 | 12/2014 | Meyer et al. |
| 8,935,889 B2 | 1/2015 | Samuelsen |
| 9,243,418 B2 | 1/2016 | Bogl et al. |
| 9,359,993 B2 | 6/2016 | Maestre et al. |
| 9,533,428 B2* | 1/2017 | Kapitza .................. E04G 13/02 |
| 9,624,687 B2 | 4/2017 | Aranzadi De Miguel et al. |
| 9,637,944 B2 | 5/2017 | Arlaban Gabeiras et al. |
| 10,100,525 B2 | 10/2018 | Aranzadi De Miguel et al. |
| 10,138,648 B2 | 11/2018 | Zavitz et al. |
| 10,486,330 B2 | 11/2019 | Giles |
| 10,519,685 B2 | 12/2019 | Viselli et al. |
| 10,738,499 B2 | 8/2020 | Carrillo Alonso et al. |
| 10,895,089 B2 | 1/2021 | Garduno Estebanez et al. |
| 11,021,887 B2 | 6/2021 | Keller et al. |
| 2005/0005562 A1* | 1/2005 | Henderson .............. F03D 13/20 52/633 |
| 2008/0072511 A1* | 3/2008 | Phuly ...................... E02D 27/28 52/294 |
| 2011/0138704 A1* | 6/2011 | Bagepalli ................ E04H 12/16 52/147 |
| 2011/0138707 A1* | 6/2011 | Bagepalli ................ E04H 12/16 52/223.13 |
| 2013/0186013 A1* | 7/2013 | Jones ...................... F03D 13/10 52/745.18 |
| 2014/0102039 A1* | 4/2014 | Wagner .................. F03D 80/50 52/745.18 |
| 2014/0237932 A1* | 8/2014 | Moestrup .............. E04H 12/342 52/745.18 |
| 2014/0290161 A1* | 10/2014 | Zavitz .................... E04H 12/342 52/223.14 |
| 2016/0084220 A1* | 3/2016 | Moeller ................... G01B 5/25 33/533 |
| 2016/0215520 A1* | 7/2016 | Samuelsen ............. F03D 13/10 |
| 2016/0305405 A1 | 10/2016 | Kraft |
| 2017/0016244 A1* | 1/2017 | Keller ................. E04G 21/0463 |
| 2017/0248126 A1* | 8/2017 | Pedersen ................ F03D 13/20 |
| 2018/0128003 A1* | 5/2018 | Brockman ............ E04H 12/085 |
| 2019/0106856 A1 | 4/2019 | Lockwood et al. |
| 2019/0152165 A1* | 5/2019 | Tobin ...................... B29C 70/38 |
| 2019/0292803 A1* | 9/2019 | Meyer .................... B33Y 70/00 |
| 2019/0338757 A1* | 11/2019 | Helmens ................. B66C 23/32 |
| 2020/0080335 A1* | 3/2020 | Kersten ................. E04H 12/085 |
| 2020/0139259 A1 | 5/2020 | Rivera de Finkbeiner |
| 2020/0149300 A1 | 5/2020 | Meyer et al. |
| 2021/0017784 A1* | 1/2021 | Ma .......................... F03D 13/10 |
| 2021/0172426 A1 | 6/2021 | Stracke |
| 2021/0214913 A1* | 7/2021 | Cotrell .................... E02D 27/52 |
| 2021/0222452 A1 | 7/2021 | Serna Garcia-Conde et al. |
| 2021/0396034 A1* | 12/2021 | Turnquist ................ B28B 1/001 |
| 2021/0396213 A1* | 12/2021 | Cooper .................. B33Y 70/00 |
| 2022/0002961 A1* | 1/2022 | Cotrell .................... E02B 17/025 |
| 2022/0003344 A1* | 1/2022 | Klaassen .............. E04H 12/085 |
| 2022/0032496 A1* | 2/2022 | Fang .................... E04G 21/0463 |
| 2022/0032497 A1* | 2/2022 | Turnquist ................ E04H 12/34 |
| 2022/0034108 A1* | 2/2022 | Cooper .................. F03D 13/20 |
| 2022/0034115 A1* | 2/2022 | Turnquist .............. E04H 12/342 |
| 2022/0034116 A1* | 2/2022 | Turnquist ............ E04G 21/0463 |
| 2022/0034303 A1* | 2/2022 | Turnquist ................ E04H 12/12 |
| 2022/0049520 A1 | 2/2022 | Holscher |
| 2022/0049521 A1* | 2/2022 | Turnquist .............. E04H 12/341 |
| 2022/0154486 A1* | 5/2022 | Turnquist ............ E04G 21/0463 |
| 2022/0235739 A1* | 7/2022 | Fenger .................. B66C 23/207 |
| 2022/0280990 A1* | 9/2022 | Brenner ................ E04H 12/342 |
| 2022/0307478 A1* | 9/2022 | Azizi .................... B66C 23/185 |
| 2022/0341152 A1* | 10/2022 | Turnquist ................ F03D 13/10 |
| 2022/0412107 A1* | 12/2022 | Turnquist ................ E04G 11/22 |
| 2023/0135211 A1* | 5/2023 | Li .......................... B28B 23/02 428/34.1 |
| 2023/0135767 A1* | 5/2023 | Li ........................ E04H 12/341 264/34 |
| 2023/0407665 A1* | 12/2023 | Sheinman .............. B33Y 80/00 |
| 2024/0033967 A1* | 2/2024 | Kenny .................... B33Y 10/00 |
| 2024/0157644 A1* | 5/2024 | Tobin ..................... B33Y 40/00 |
| 2024/0159077 A1* | 5/2024 | Turnquist ................ B28B 1/001 |

FOREIGN PATENT DOCUMENTS

| | | |
|---|---|---|
| CN | 106523295 A | 3/2017 |
| CN | 206054183 U | 3/2017 |
| CN | 206175136 U | 5/2017 |
| CN | 208996874 U | 6/2019 |
| CN | 209244730 U | 8/2019 |
| CN | 214403858 U | 10/2021 |
| CN | 214464676 U | 10/2021 |
| CN | 214464685 U | 10/2021 |
| CN | 113602954 A | 11/2021 |
| CN | 113666263 A | 11/2021 |
| CN | 113719419 A | 11/2021 |
| CN | 214577530 U | 11/2021 |
| CN | 214577532 U | 11/2021 |
| CN | 214741844 U | 11/2021 |
| CN | 215170538 U | 12/2021 |
| DE | 10230273 B3 | 2/2004 |
| EP | 2807317 B1 | 12/2015 |
| EP | 2744955 B1 | 1/2016 |
| EP | 3095569 A1 | 11/2016 |
| EP | 3315694 A1 | 5/2018 |
| EP | 3502378 A1 | 6/2019 |
| EP | 3845354 A2 | 7/2021 |
| EP | 3856485 A1 | 8/2021 |
| EP | 3857003 A1 | 8/2021 |
| EP | 3857058 A1 | 8/2021 |
| EP | 3862155 A1 | 8/2021 |
| EP | 3924577 A1 | 12/2021 |
| EP | 4053360 A1 | 9/2022 |
| ES | 2350135 B2 | 10/2012 |
| WO | WO2012/122976 A2 | 9/2012 |
| WO | WO2013/110448 A1 | 8/2013 |
| WO | WO2019/008135 A1 | 1/2019 |
| WO | WO2019/193388 A1 | 10/2019 |
| WO | WO2020/068122 A1 | 4/2020 |
| WO | WO-2020068119 A1 * | 4/2020 ............ B28B 1/001 |
| WO | WO-2020068124 A1 * | 4/2020 ............ B33Y 10/00 |
| WO | WO-2020069070 A1 * | 4/2020 ............ B33Y 10/00 |
| WO | WO2021/101558 A1 | 5/2021 |
| WO | WO2021/229125 A1 | 11/2021 |

OTHER PUBLICATIONS

Buswell et al., 3D Printing Using Concrete Extrusion: A Roadmap for Research, Cement and Concrete Research, National Institute of Standards and Technology, vol. 112, Oct. 2018, pp. 37-49.

Krause et al., Strategic Optimization of 3D-Concrete Printing Using the Method of CONPrint3D, 35$^{th}$ International Symposium on Automation and Robotics in Construction (ISARC 2018) Conference, Jul. 2018, 8 Pages.

Rodrigues-Pires, Design of Concrete-Steel Transitions in a Hybrid Wind Turbine Tower, 2013, 82 Pages. Retrieved from weblink:

(56) References Cited

OTHER PUBLICATIONS

Design_of_Concrete-Steel_Transitions_in_a_Hybrid_Wind_Turbine_Tower-_Thesis.

\* cited by examiner

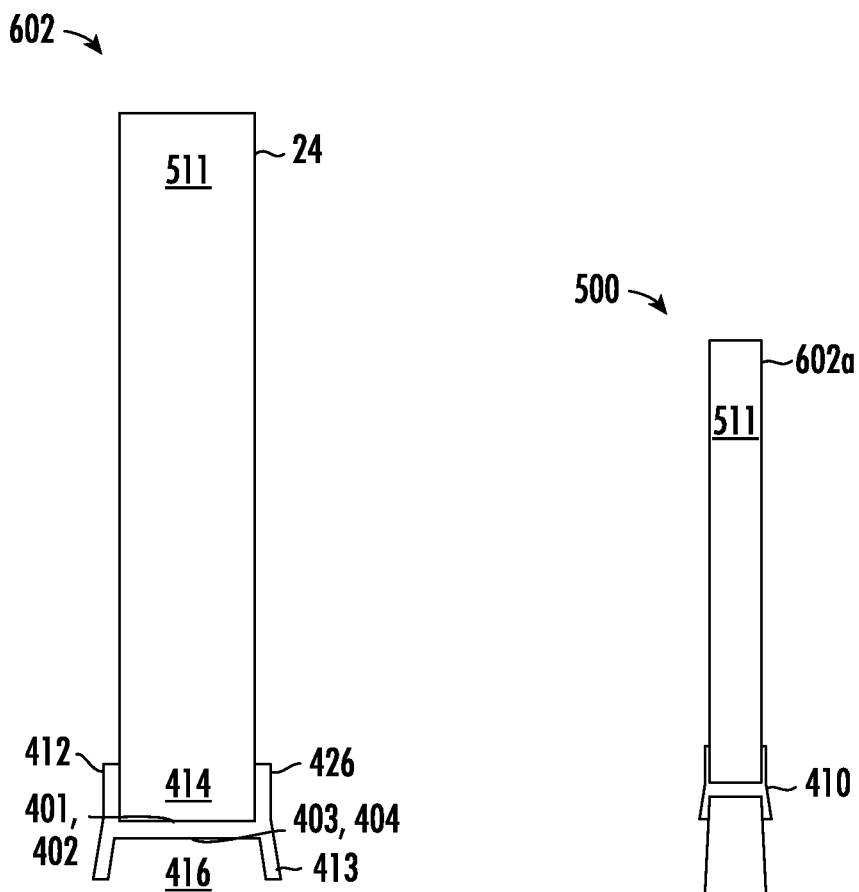
FIG. 15
FIG. 16
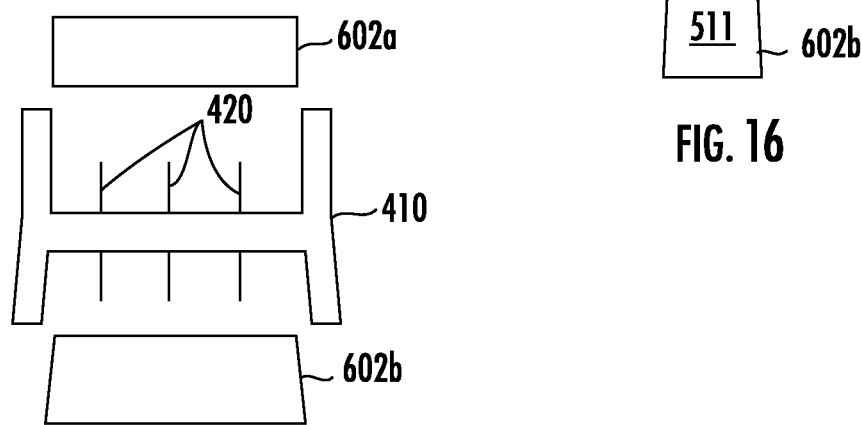
FIG. 17

WIND TURBINE TOWER STRUCTURE WITH STACKED TOWER SECTIONS

STATEMENT REGARDING FEDERALLY SPONSORED RESEARCH OR DEVELOPMENT

This invention was made with Government support under Contract No. DE-EE0009059 awarded by the U.S. Department of Energy (DOE). The Government has certain rights in the invention.

FIELD

The present disclosure relates to a tower structure for a wind turbine, and more particularly to a tower structure having a plurality of stacked tower sections.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, certain conventional manufacturing method include forming pre-cast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g., via bolting and/or welding. Such methods, however, require extensive labor and can be time-consuming.

In view of the foregoing, the art is continually seeking improved methods for manufacturing wind turbine towers. For example, more recently, progress has been made in the construction of wind turbine towers, at least in part, using additive manufacturing techniques. Such methods allow for the tower structures to be erected on site and also allows the structures to be built to taller heights.

Accordingly, the present disclosure is directed to a tower structure having a plurality of stacked tower sections, and methods of manufacturing and assembling the same, that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to embodiments of a tower structure with at least partially additively manufactured, stacked tower sections. Embodiments of the tower structure have a plurality of stacked tower sections, wherein at least one tower section of the plurality of stacked tower sections includes a wall element having one or more printed layers, and a base holding thereon the one or more printed layers, and wherein at least one of the wall element or the base comprises a lift connection element.

In still another aspect, the present disclosure is directed to embodiments of a tower structure having a plurality of stacked tower sections, wherein at least one tower section of the plurality of stacked tower sections includes a wall element having one or more printed layers, and a fixed lift connection element, and wherein the fixed lift connection element may be integral to at least the wall element.

In still another aspect, the present disclosure is directed to a method of manufacturing a tower structure using stacked tower sections and additive manufacturing. Embodiments of the method include forming a base of poured concrete or cast material, printing and depositing one or more printed layers to form a wall element, installing a lift connection element on at least the wall element or the base, and stacking the plurality of tower sections to form the tower structure.

In still another aspect, the present disclosure is directed to a method of assembling a tower structure including forming a mold of poured concrete or cast material, forming a base of poured concrete or cast material, forming a plurality of tower sections using the mold, and stacking the plurality of tower sections on top of the base to form the tower structure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which . . . .

FIG. 15 illustrates a cross sectional view of a tower section of a tower structure of a wind turbine according to the present disclosure;

FIG. 16 illustrates a cross sectional view of a tower structure with at least one tower section of FIG. 15 according to the present disclosure;

FIG. 17 an exploded, cross sectional view of a transition system of the tower structure of FIG. 16 according to the present disclosure;

Figure 1:
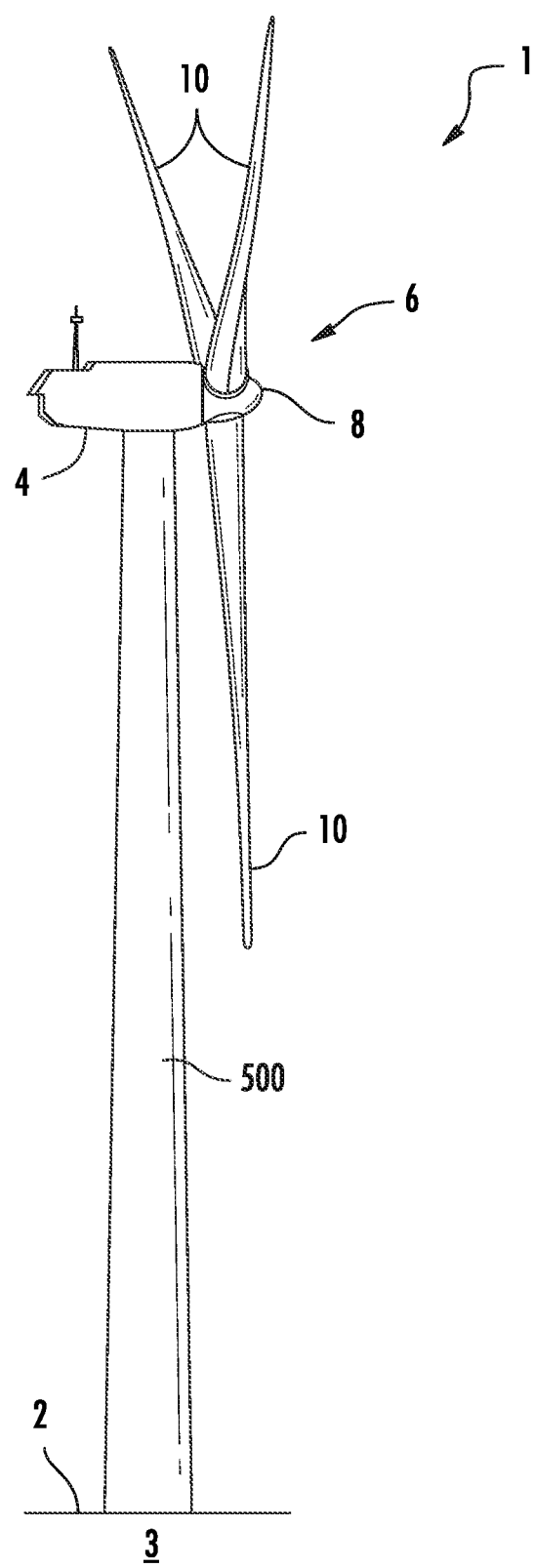
FIG. 1 illustrates a perspective view of an embodiment of a wind turbine according to the present disclosure.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to additively manufactured structures, additive manufacturing systems, and additive manufacturing methods for manufacturing a tower structure, such as a wind turbine tower. "Additively manufactured structures" as used herein refers to structures formed using automated deposition of sequential layers (e.g., print layers) of cementitious material, such as concrete, and/or other construction materials, via "additive manufacturing" technologies such as additive manufacturing, 3-D printing, spray deposition, extrusion additive manufacturing, concrete printing, automated fiber deposition, as well as other techniques that utilize computer numerical control and multiple degrees of freedom to deposit material.

"Additive manufacturing" as used herein refers to processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

For example, the present disclosure is directed to embodiments of a method of manufacturing a tower structure using stacked tower sections and additive manufacturing. Embodiments of the method include forming a base of poured concrete or cast material, printing and depositing one or more printed layers to form a wall element, installing a lift connection element on at least the wall element or the base, and stacking the plurality of tower sections to form the tower structure. Depending on the embodiment, the plurality of tower sections may be printed and deposited directly on the base, or separately printed and deposited (on a mold, for example) and subsequently placed on the base or on another tower section, for example. Moreover, depending on the embodiment and assuming the plurality of tower sections are separately printed, the plurality of tower sections may also be printed and deposited on a mold and subsequently placed on the base (or on another tower section, for example).

Therefore, the present disclosure also is directed to embodiments of a tower structure with at least partially additively manufactured, stacked tower sections. Embodiments of the tower structure have a plurality of stacked tower sections, wherein at least one tower section of the plurality of stacked tower sections includes a wall element having one or more printed layers, and a base holding thereon the one or more printed layers, and wherein at least one of the wall element or the base comprises a lift connection element. Depending on the embodiment, the base may be a fixed base having a surface for printing and depositing thereon the one or more printed layers. Depending on the embodiment, the base also may have a top side including an alignment element, wherein the top side of the base is for holding the wall element comprising the one or more printed layers, and wherein the wall element comprises an alignment element corresponding to the alignment element of the base.

In another embodiment, the base may be a fixed base for the at least one tower section of the plurality of stacked tower sections, and the fixed base may be a transition system connecting the at least one tower section with an adjacent stacked tower section of the plurality of stacked tower sections. The transition system may have a top side including the surface of the base holding the one or more printed layers, and a poured concrete or cast material tubular wall. The poured concrete or cast material tubular wall and the surface of the top side of the base may define a cavity, with the cavity receiving at least one layer of the one or more printed layers. The transition system also may have a bottom side including a surface and a poured concrete or cast material tubular wall defining a constraining ring. The constraining ring and the surface of the bottom side of the base may define a cavity, with the cavity receiving at least a top layer of one or more printed layers of the adjacent stacked tower section.

In another embodiment, the surface of the bottom side of the transition system may be for flattening at least the top layer of the one or more printed layers of the adjacent stacked tower section.

In another embodiment, the base may have a top side for holding the wall element, with the top side including an alignment element. The wall element also may have an alignment element corresponding to the alignment element of the top side of the base, with the alignment element of the wall element and the alignment element of the base facilitating alignment of the wall element and the base.

In another embodiment, the tower structure may have a plurality of stacked tower sections, wherein at least one tower section of the plurality of stacked tower sections includes a wall element having one or more printed layers, and a fixed lift connection element. The fixed lift connection element may be integral to at least the wall element. The fixed lift connection element also may have a surface holding thereon the one or more printed layers of the wall element. Moreover, the fixed lift connection element also may have a surface for printing and depositing directly thereon the one or more printed layers. In particular, the fixed lift connection element may be a steel lifting plate integral to at least the wall element, and, even more specifically, the steel lifting plate may be integral to at least a bottom layer the one or more printed layers of the wall element.

In another embodiment, a method of assembling a tower structure includes forming a mold of poured concrete or cast material, forming a base of poured concrete or cast material, forming a plurality of tower sections using the mold, and stacking the plurality of tower sections on top of the base to form the tower structure. Depending on the embodiment, forming at least one tower section of the plurality of tower sections may include printing and depositing one or more printed layers on a top side of the mold to form a wall element, the top side of the mold comprising an alignment mold such that the wall element(s) printed and deposited thereon comprises an alignment element, and installing a lift connection element on at least the wall element or the base. Depending on the embodiment, stacking the plurality of tower sections to form the tower structure may include lifting, via the lift connection element, each of the plurality of tower sections, aligning the at least one tower section and an adjacent tower section via the alignment element, and stacking the at least one tower section on the adjacent tower section.

In another embodiment, stacking the plurality of tower sections to form the tower structure also may include capping the stacked plurality of tower sections using, for example, a cap section.

Referring now to the drawings, FIG. 1 illustrates a perspective view of an embodiment of a tower structure 500 according to the present disclosure. As depicted in FIG. 1, the tower structure 500 may be a component of a wind turbine 1. As shown, the wind turbine 1 generally includes a tower structure 500 extending from a support surface 2 on top of a foundation 3, a nacelle 4 mounted on the tower structure 500, and a rotor 6 coupled to the nacelle 4. The rotor 6 includes a rotatable hub 8 and at least one rotor blade 10 coupled to and extending outwardly from the hub 8. For example, in the illustrated embodiment, the rotor 6 includes three rotor blades 10. However, in another embodiment, the rotor 6 may include more or less than three rotor blades 10. Each rotor blade 10 may be spaced about the hub 8 to facilitate rotating the rotor 6 to enable kinetic energy to be transferred from the wind into usable mechanical energy, and subsequently, electrical energy. For instance, the hub 8 may be rotatably coupled to an electric generator (not shown) positioned within the nacelle 4 to permit electrical energy to be produced.

It should be appreciated that while discussed herein in reference to a wind turbine tower, the present disclosure is not limited to wind turbine towers but may be utilized in any application having concrete construction and/or tall tower structures. For example, the present disclosure may be utilized in the additive manufacturing of homes, buildings, portions of buildings, bridges, towers, poles, and other aspects of the concrete industry. Further, the methods described herein may also apply to manufacturing any similar structure that benefits from the advantages described herein, e.g., a wind turbine support tower, a cooling tower, a communications tower, a bridge pylon, a smokestack, a transmission tower, an observation tower, a dwelling, an office, an ornamental tower, a water tower, a silo, and/or other similar structures.

Figure 2:
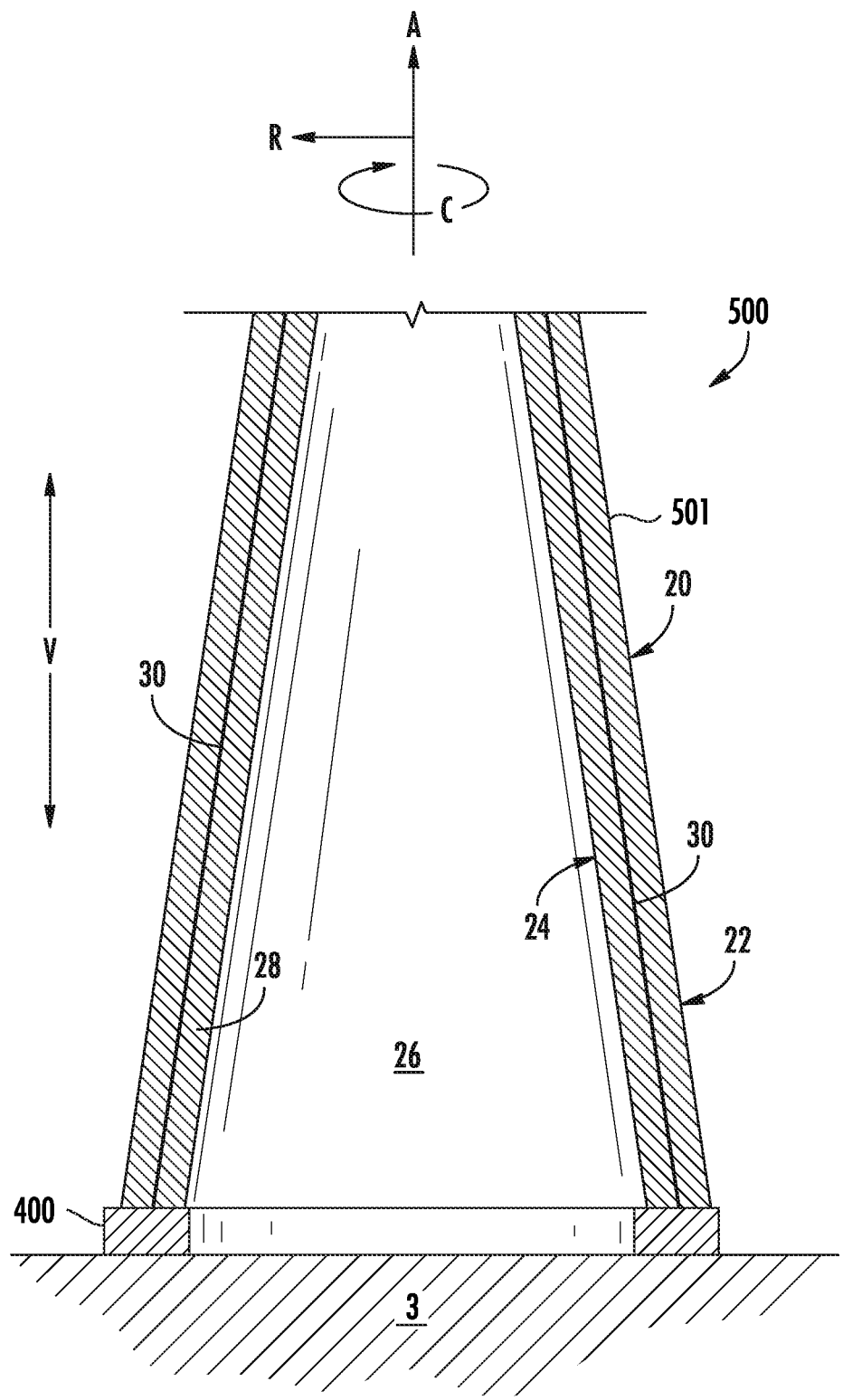
FIG. 2 illustrates a partial, cross-sectional view of an embodiment of a tower structure of a wind turbine according to the present disclosure.

Referring now to FIG. 2, the tower structure 500 of the wind turbine 1 of FIG. 1 is described in more detail according to an embodiment. Specifically, FIG. 2 illustrates a partial, cross-sectional view of an embodiment of the tower structure 500, in particular, at least one tower section 501 of the tower structure 500. As shown, the tower structure 500 defines a generally circumferential tower wall 20 having an outer wall element 22 and an inner wall element 24 held on a base 400. Further, as shown, the circumferential tower wall 20 generally defines a hollow interior 26 that is commonly used to house various turbine components (e.g., a power converter, transformer, etc.). Moreover, in an embodiment, the tower structure 500 is formed using additive manufacturing and additive manufacturing equipment may be engaged to and climb on the inner wall element 24 while in the hollow interior 26.

Furthermore, as shown, the tower structure 500 may be formed of one or more cementitious materials reinforced with one or more reinforcement members 30, such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to an embodiment, cementitious material may be provided through any suitable supply system 32 (see, e.g., FIG. 4). Further, the reinforcement members 30 may be precisely placed, tracked, mapped, and embedded in the cementitious material during the printing process. As used herein, cementitious materials include any suitable workable paste that is configured to bind together after curing to form a structure. Suitable cementitious materials include, for example, concrete, pitch resin, asphalt, geopolymers, polymers, cement, mortar, cementitious compositions, or similar materials or compositions.

According to an embodiment of the present disclosure, an adhesive material (not shown), a cold joint primer (not shown), and/or steel/metal/alloy/composite frame(s) or end cap(s) in the form of C-shaped frames, for example, (not shown) may also be provided between cementitious materials and the foundation 3, cementitious materials and reinforcement members 30, or multiple layers of the cementitious materials and reinforcement members 30. Thus, these materials may further supplement or complement interlayer bonding between materials, facilitate integration or use of pre-fabricated components or formwork, or simply provide aesthetic benefits (e.g., capping off the rough edges of an additively manufactured wall of cementitious material in a tower structure 500).

"Adhesive material" as used herein refers to cementitious material such as mortar, polymeric materials, and/or admixtures of cementitious material and polymeric material. Adhesive formulations that include cementitious material are referred to herein as "cementitious mortar." "Cementitious mortar" as used herein refers to any cementitious material that may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Polymeric materials that may be utilized in an adhesive formulation include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of certain polymeric materials are described in ASTM C1059/C1059M-13, Standard Specification for Latex Agents for Bonding Fresh to Hardened Concrete.

Figure 3:
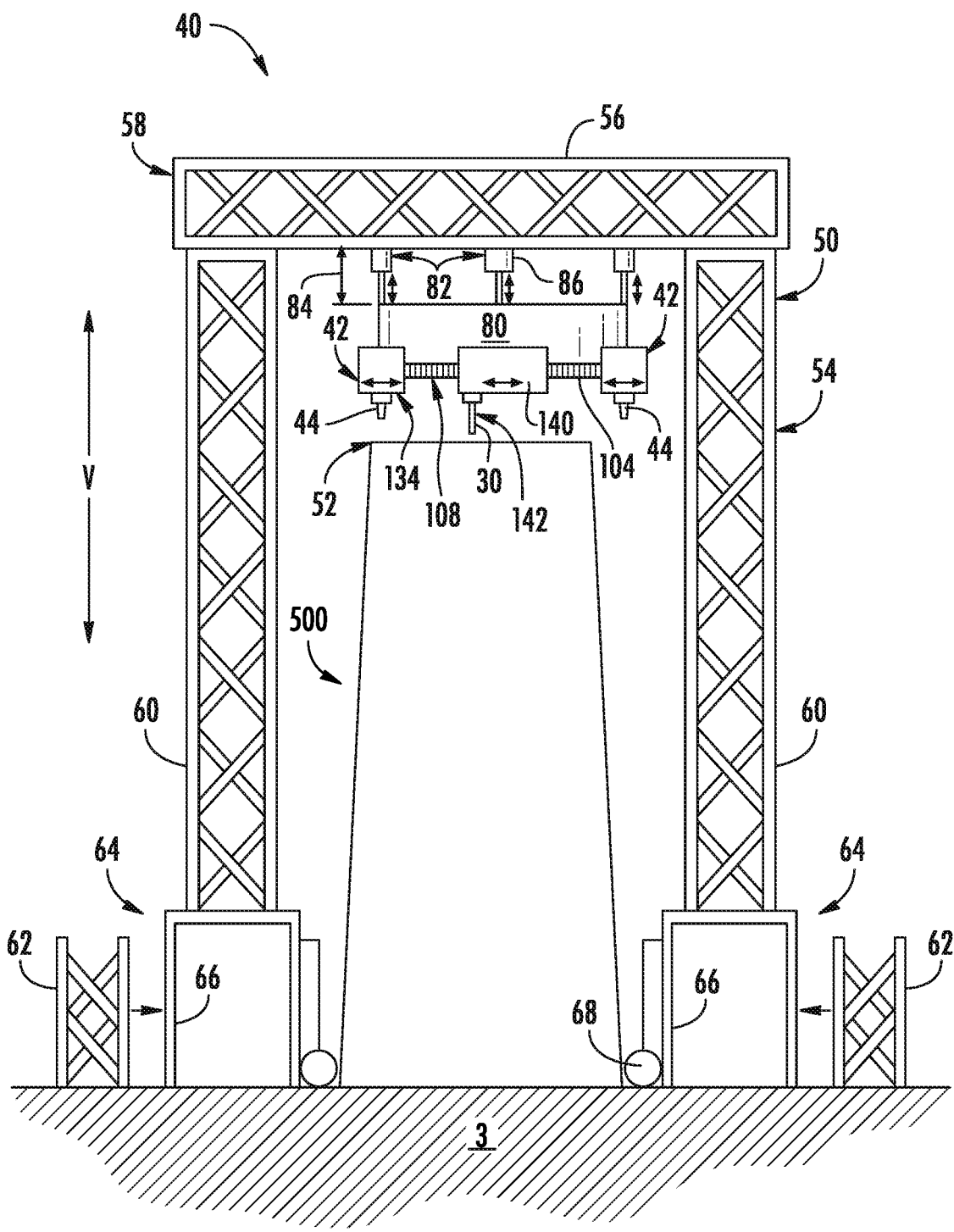
FIG. 3 illustrates a schematic view of an embodiment of an additive printing system being used to print structures according to the present disclosure.
Figure 4:
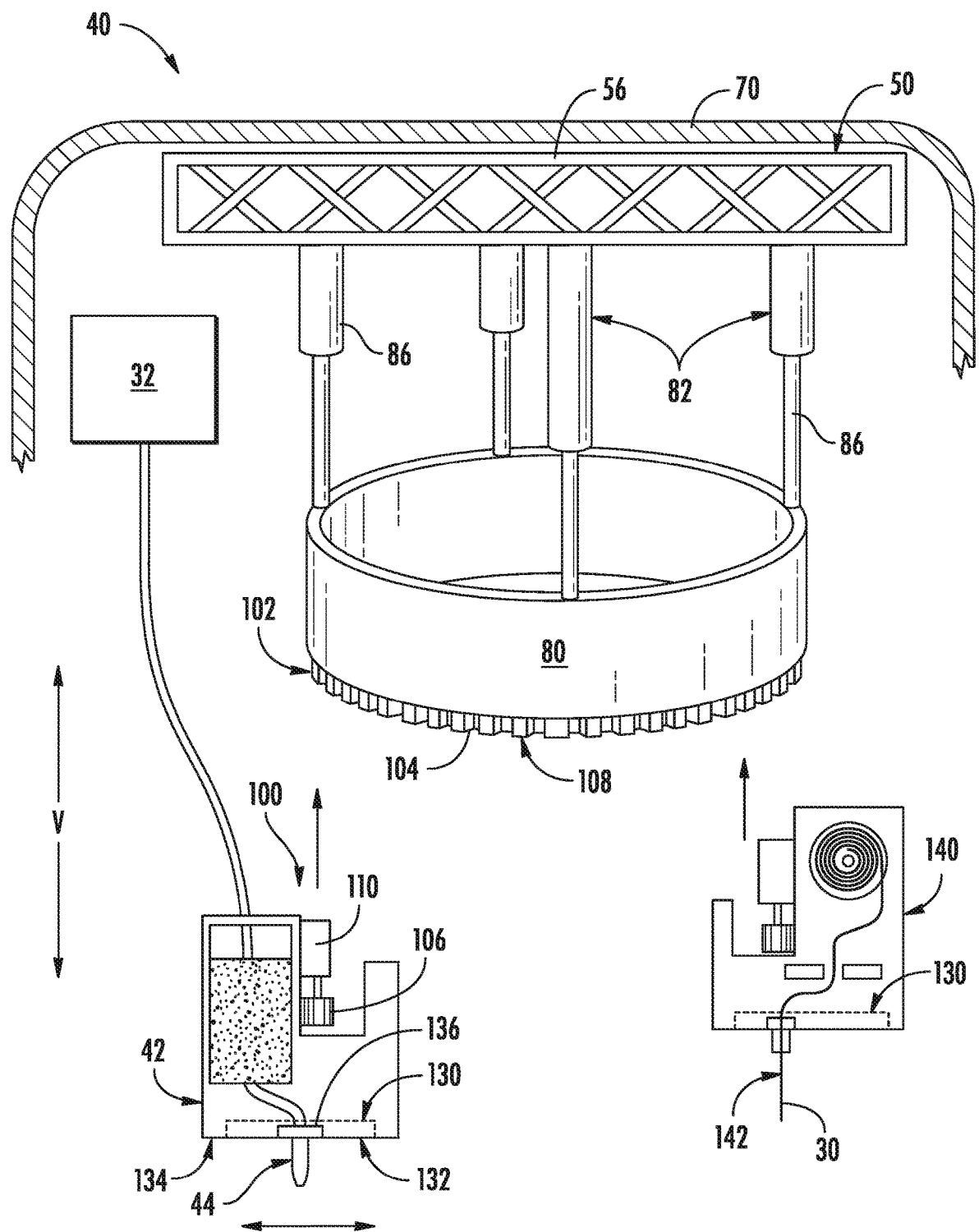
FIG. 4 illustrates a close-up view of certain components of the additive printing system of FIG. 3 according to the present disclosure.
Figure 5:
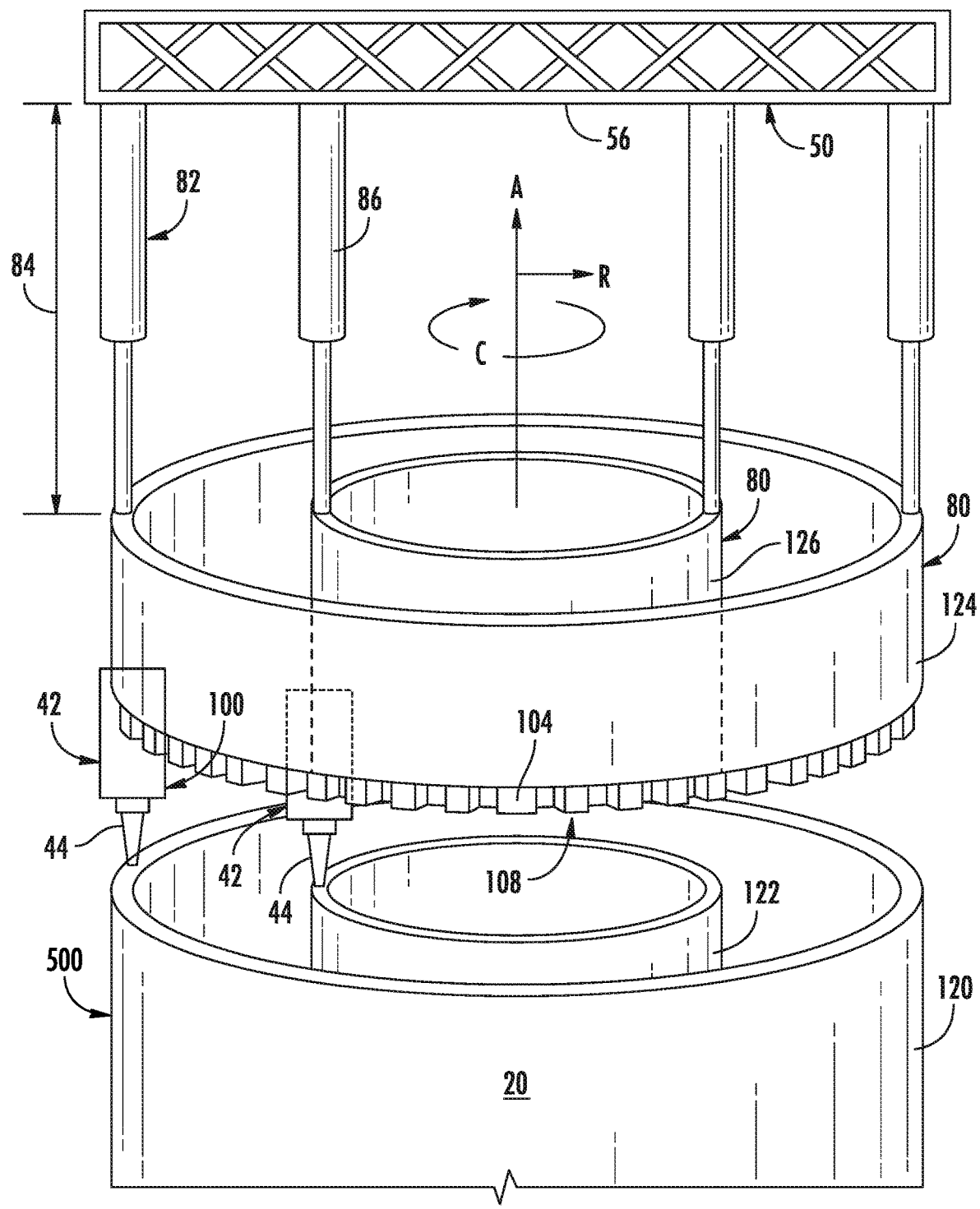
FIG. 5 illustrates another close-up view of an embodiment of certain components of an additive printing system according to the present disclosure.

Referring now to FIGS. 3-5, an additive printing system 40 is illustrated according to an embodiment of the present disclosure. Notably, all or part of tower structure 500 of FIGS. 1-2 may be printed, layer-by-layer, or cast via material deposition or material backfill, using the additive printing system 40, which may use any suitable mechanisms for depositing layers of additive material or quantities of material, such as concrete, to form the tower structure 500. The additive printing system 40 has one or more nozzles for depositing material onto the foundation 3. The nozzles are controlled by a controller 200 (see FIG. 9) to form an object programmed within the controller processor (such as a CAD file; described in detail herein).

More specifically, as shown in FIG. 3 and described herein, the additive printing system 40 includes one or more printheads 42 having any suitable number of deposition nozzles 44 and being independently movable to simultaneously print layers of the tower structure 500.

The additive printing system 40 may include a vertical support structure 50 which is generally configured for suspending one or more of the printheads 42 above the tower structure 500 during the printing process. In this regard, the vertical support structure 50 may extend from the ground or from foundation 3 upwards substantially along a vertical direction V to a position at least partially above a top 52 of the tower structure 500 (e.g., and also above foundation 3 before the first layer is printed).

The vertical support structure 50 may include a plurality of support towers 54 and one or more gantry beams 56 that extend between at least two of the support towers 54. Although two support towers 54 and a single gantry beam 56 are illustrated in the FIGS. 3-5, it should be appreciated that any suitable number and position of support towers 54 may be used according to alternative embodiments. In addition, the support towers 54 and the gantry beams 56 are illustrated as being truss-like structures (e.g., similar to a tower crane), but could be formed in any other suitable manner or have any other configuration according to alternative embodiments.

In addition, although the vertical support structure 50 is illustrated as being positioned on the outside of the tower structure 500, it should be appreciated that according to alternative embodiments, the vertical support structure 50 may be positioned inside the tower structure 500. According to still other embodiments, the vertical support structure 50 may include the support towers 54 positioned both inside and outside of the tower structure 500. In addition, the additive printing system 40 may be suspended from the vertical support structure 50 using any other suitable system or mechanism.

Notably, during the additive printing process, the top 52 of tower structure 500 is built layer-by-layer, rising along the vertical direction V. Therefore, the vertical support structure 50 may be an expandable support structure which may be raised along with the height of tower structure 500. In this regard, the vertical support structure 50 may be formed from a plurality of stacked segments 60 which are positioned adjacent each other along the vertical direction V and joined to form the rigid vertical support structure 50. Thus, when the tower structure 500 approaches the top 58 of the vertical support structure 50, additional segments 62 may be added to stacked segments 60 to raise the overall height of vertical support structure 50.

Referring specifically to FIG. 3, additional segments 62 may be combined with stacked segments 60 to raise the vertical support structure 50 using a jacking system 64. In general, as shown, the jacking system 64 may be positioned proximate foundation 3 and is configured for raising the vertical support structure 50 (e.g., including the stacked segments 60 and the gantry beams 56) and inserting additional segments 62. Specifically, a separate jacking system 64 may be positioned at a bottom of each support tower 54.

According to an embodiment, the jacking system 64 may include a jacking frame 66 and a jacking mechanism 68 which are positioned at the bottom of stacked segments 60. The jacking mechanism 68 described herein may generally be any suitable hydraulically, pneumatically, or other mechanically actuated system for raising the vertical support structure 50. Accordingly, when additional segments 62 need to be added, a dedicated jacking mechanism 68 simultaneously raises each of the support towers 54 such that additional segments 62 may be inserted. Specifically, the jacking frame 66 may support the weight of the vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of the vertical support structure 50.

In certain situations, it may be desirable to protect the tower structure 500 and components of the additive printing system 40 from the external environment in which they are being used. In such embodiments, the tower cover 70 may generally be any suitable material positioned around the vertical support structure 50. For example, the tower cover 70 (see FIG. 4) may be a fabric-like material draped over or attached to the vertical support structure 50 (e.g., over the support towers 54 and/or the gantry beams 56).

As mentioned above, the vertical support structure 50 is generally configured for supporting one or more of the printheads 42 and or other modules which facilitate the formation of the tower structure 500. Referring specifically to FIGS. 3 through 5, the additive printing system 40 may further include one or more support members, such as support rings 80, that are suspended from the vertical support structure 50, or more specifically from gantry beams 56, above the tower structure 500. For example, as illustrated, the support ring 80 is mounted to the gantry beam 56 using a vertical positioning mechanism 82. In general, the vertical positioning mechanism 82 is configured for adjusting a height or vertical distance 84 measured between the gantry beam 56 and a top of support ring 80 along the vertical direction V. For example, the vertical positioning mechanism 82 may include one or more hydraulic actuators 86 extending between gantry beam 56 and support ring 80 for moving support ring 80 and printheads 42 along the vertical direction V as tower structure 500 is built up layer-by-layer.

As illustrated, the hydraulic actuators 86 are configured for adjusting the vertical distance 84 to precisely position the deposition nozzles 44 of the printheads 42 immediately above top 52 of the tower structure 500. In this manner, the additive printing process may be precisely controlled. However, it should be appreciated that according to alternative embodiments, the vertical motion of the printheads 42 may be adjusted in any other suitable manner. For example, according to an embodiment, the support ring 80 may be rigidly fixed to the gantry beam 56 while the support ring 80 and/or the printheads 42 are used to facilitate vertical motion to precisely position the deposition nozzles 44. For example, the printheads 42 may be slidably mounted to the support ring 80 using a vertical rail and positioning mechanism to adjust the vertical position relative to the support ring 80 and the tower structure 500.

According to the illustrated embodiment, the printhead(s) 42 is movably coupled to the support ring 80 such that the deposition nozzles 44 may deposit cementitious material around a perimeter of tower structure 500 while the support ring 80 remains rotationally fixed relative to gantry beam 56. In this regard, for example, a drive mechanism 100 may operably couple the printhead(s) 42 to the support ring 80 such that printhead(s) 42 may be configured for moving around a perimeter 102 of the support ring 80 (e.g., about a circumferential direction C) while selectively depositing the cementitious material. An embodiment of a drive mechanism 100 is described below and illustrated in the figures, but it should be appreciated that other drive mechanisms are contemplated and within the scope of the present disclosure.

As best shown in FIG. 4, for example, the drive mechanism 100 may include a ring gear 104 that is positioned on the support ring 80 and a drive gear 106 that is rotatably mounted to printhead 42. Specifically, as illustrated, the ring gear 104 is defined on a bottom 108 of the support ring 80. Thus, when printhead(s) 42 42 is mounted on the bottom 108 of support ring 80, drive gear 106 engages ring gear 104. The drive mechanism 100 may further include a drive motor 110 that is mechanically coupled to the drive gear 106 for selectively rotating the drive gear 106 to move printhead(s) 42 around a perimeter 102 of the support ring 80. In this manner, the support ring 80 may remain stationary while printhead(s) 42 moves around the support ring 80 while depositing cementitious material to form a cross-sectional layer of tower structure 500.

Although the drive mechanism 100 is illustrated herein as a rack and pinion geared arrangement using drive gear 106 and ring gear 104, it should be appreciated that any other suitable drive mechanism 100 may be used according to alternative embodiments. For example, the drive mechanism 100 may include a magnetic drive system, a belt drive system, a frictional roller drive system, or any other mechanical coupling between printhead(s) 42 and support ring 80 which permits and facilitates selective motion between the two.

In addition, in an embodiment, the support ring 80 may generally have a diameter that is substantially equivalent to a diameter of the tower structure 500. However, it may be desirable to print the tower structure 500 having a non-fixed diameter or a tapered profile. In addition, as illustrated for example in FIG. 5, the tower structure 500 may include an outer tower wall 120 spaced apart along a radial direction R from an inner tower wall 122. For example, the outer tower wall 120 may be printed to define a mold for receiving poured concrete, e.g., to decrease printing time and total construction time.

Thus, as shown in FIG. 5, the additive printing system 40 may include a plurality of concentric support rings 80 and printhead 42 for simultaneously printing each of the outer tower wall 120 and the inner tower wall 122. Specifically, as illustrated, an outer support ring 124 may be positioned above the outer tower wall 120 and have a substantially equivalent diameter to the outer tower wall 120. Similarly, the inner support ring 126 may be positioned above the inner tower wall 122 and have a substantially equivalent diameter to the inner tower wall 122. According to this embodiment, each of outer support ring 124 and inner support ring 126 may include dedicated printheads 42 and/or other modules for facilitating the printing process of outer tower wall 120 and inner tower wall 122, respectively.

Referring again to FIG. 4, the printhead(s) 42 may include mechanisms for adjusting the position of deposition nozzles 44 on printhead(s) 42. For example, printhead(s) 42 may include a radial adjustment mechanism 130 that is configured for moving deposition nozzle 44 along the radial direction R. Specifically, according to the illustrated embodiment, radial adjustment mechanism 130 includes a slide rail 132 mounted to a bottom 134 of the printhead 42. The slide rail 132 extends substantially along the radial direction and is configured for slidably receiving the deposition nozzle 44.

The radial adjustment mechanism 130 may further include an actuating mechanism 136 that moves deposition nozzle 44 along the radial direction R within the slide rail 132. For example, the actuating mechanism 136 may include any suitable actuator or positioning mechanism for moving deposition nozzle 44 within the slide rail 132. In this regard, for example, the actuating mechanism 136 may include one or more of a plurality of linear actuators, servomotors, track conveyor systems, rack and pinion mechanisms, ball screw linear slides, etc.

Referring still to FIGS. 4 and 5, the additive printing system 40 may include any other suitable number of subsystems or modules to facilitate and improved printing process or improved finishing of tower structure 500. For example, as illustrated in FIG. 4, the additive printing system 40 may include a reinforcement module 140 which is movably coupled to the support ring 80 and is configured for embedding one or more reinforcement members 142 at least partially within tower structure 500. In this regard, for example, the reinforcement module 140 may be similar to the printhead(s) 42 in that engages the support ring 80 and may move around a perimeter 102 of the support ring 80 while depositing the reinforcement members 142.

For example, according to an embodiment, the reinforcement members 142 may be reinforcement bars (i.e., rebar), tensioning cables, or any other suitable structural reinforcement members, as explained briefly below. For example, as shown in FIG. 2, the reinforcement module 140 may embed one or more reinforcement members 30 at least partially within one or more of portions of the tower structure 500. In this regard, the reinforcement module 140 positions reinforcement members 30 at least partially within the tower structure 500. It should be understood that such reinforcement members 30 may extend along the entire height of the tower structure 500 (e.g., as shown in FIG. 2) or along only a portion of the tower height.

Similarly, referring still to FIGS. 3 and 4, the additive printing system 40 also may be configured to supply backfill material, for example, via a mechanism movably coupled to the support ring 80 and configured for depositing backfill material and/or any other quantity of material as described herein. In this regard, for example, such a mechanism may be similar to the printhead(s) 42 and/or reinforcement module 140 in that it engages the support ring 80 and may move around a perimeter 102 of the support ring 80 while depositing a backfill material. For example, according to an embodiment, the backfill material described herein may include any suitable workable paste that is configured to bind together after curing to form a structure. Suitable materials include, for example, concrete, pitch resin, asphalt, clay, cement, mortar, cementitious compositions, geopolymer materials, polymer materials, or similar materials or compositions. Other suitable materials, for casting include, for example, steel, aluminum, and other alloys, compositions, and materials.

Figure 6:
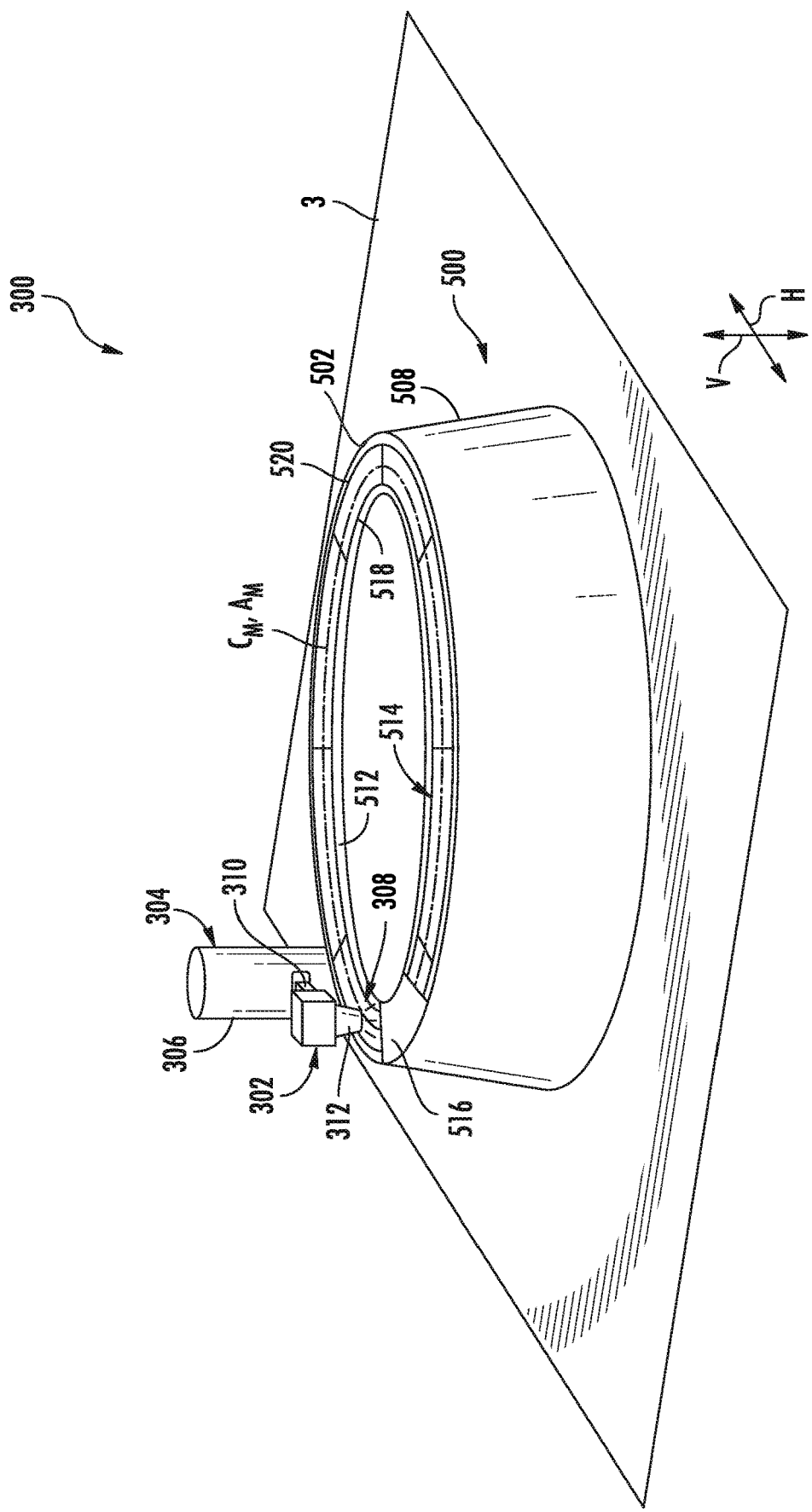
FIG. 6 illustrates a perspective view of another embodiment of an additive printing system being used to print the structures according to the present disclosure.
Figure 7:
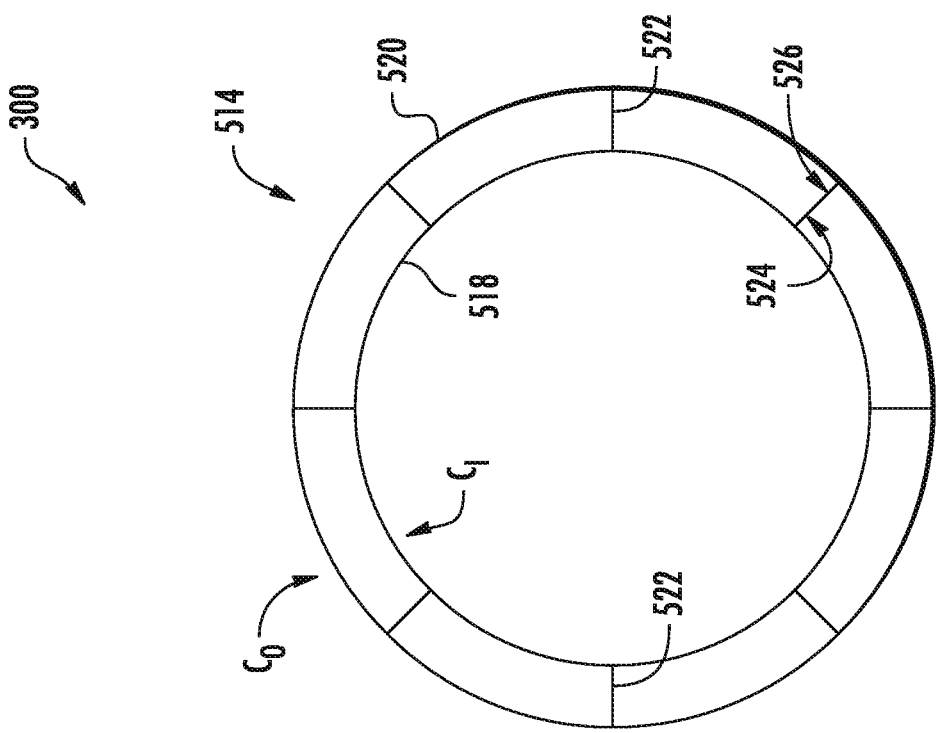
FIG. 7 illustrates a top plan view of certain components of the additive printing system of FIG. 6 according to the present disclosure and an assembled reinforcement member.
Figure 7:
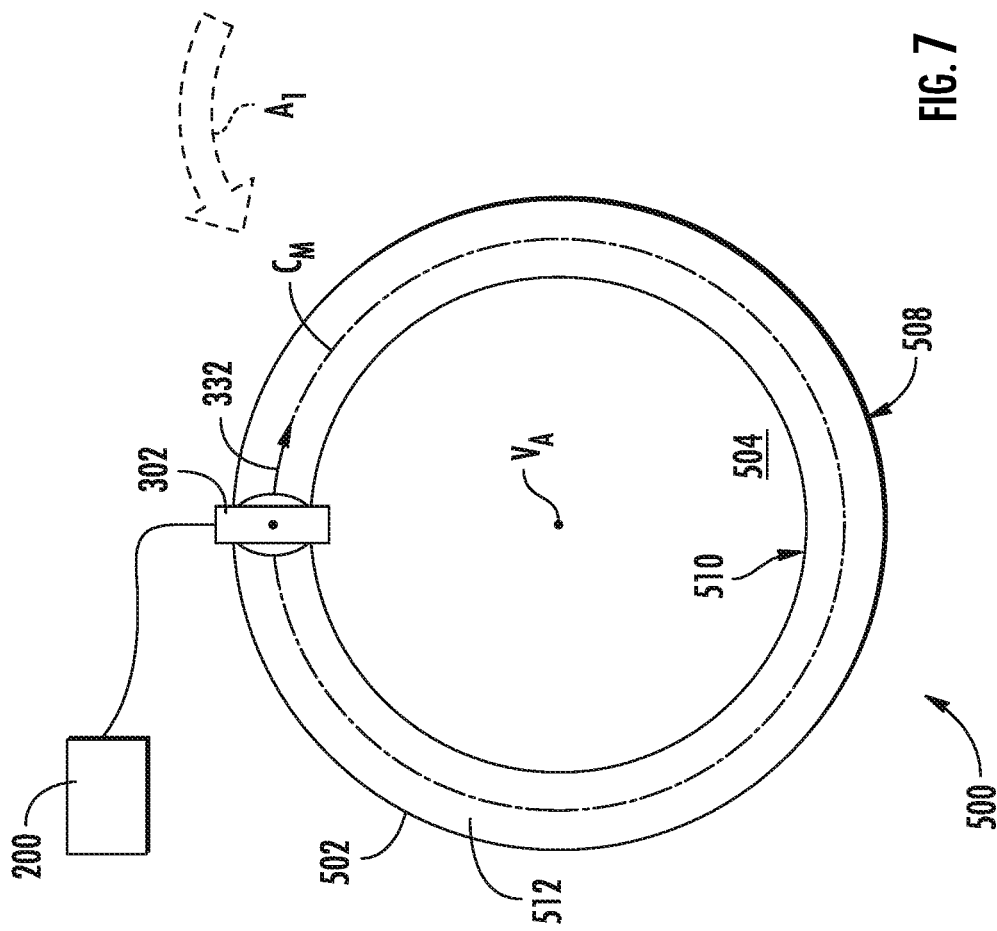
Figure 8:
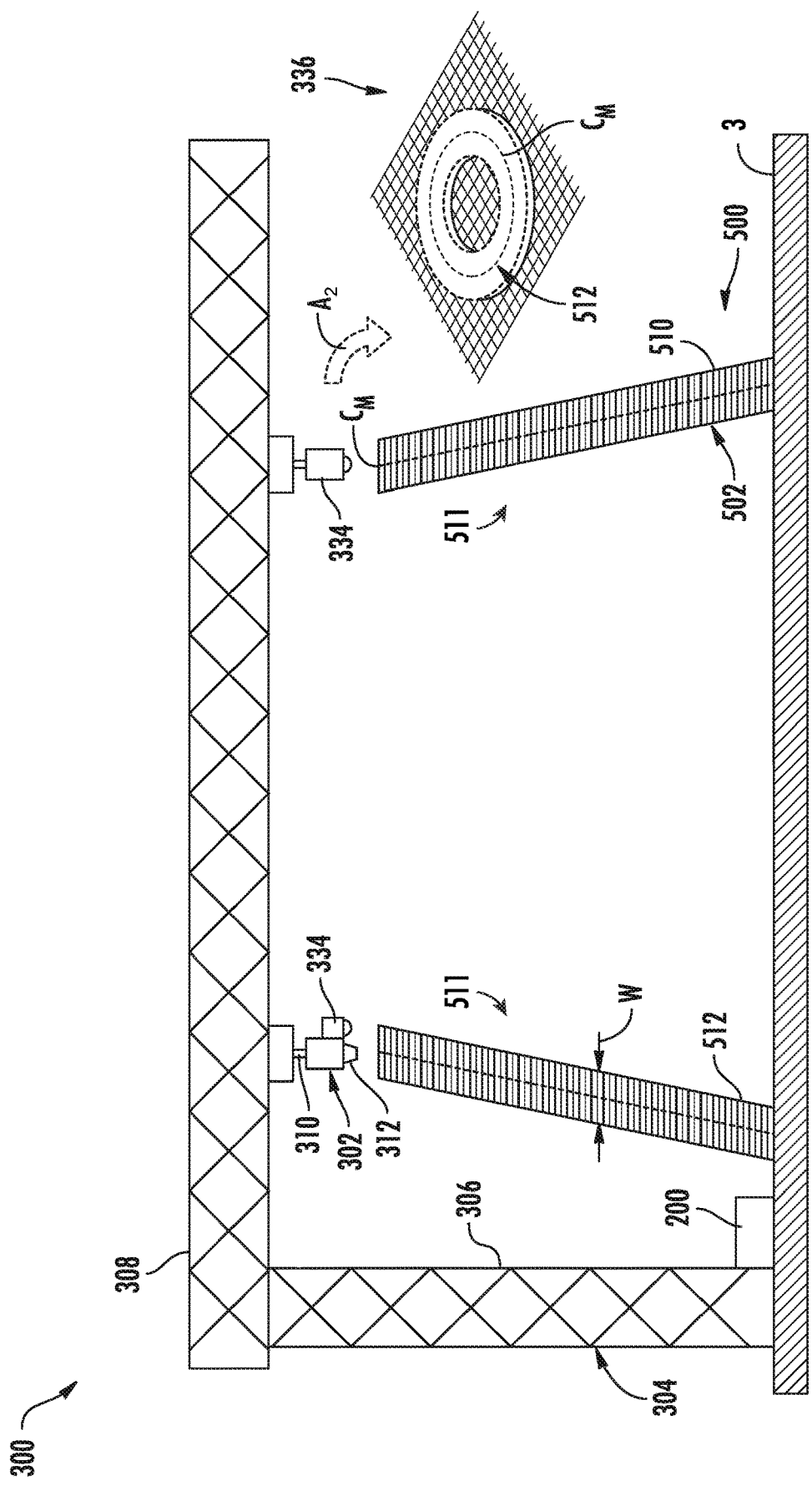
FIG. 8 illustrates a side perspective view of certain components of the additive printing system of FIG. 6 according to the present disclosure.

Referring now to FIGS. 6-8, various views of another embodiment of an additive printing system for forming a tower section of a tower structure are illustrated, in particular, an additive printing system 300 for forming a tower section 501 of a tower structure 500. As shown, the tower section 501 may be formed by depositing one or more layers of a wall 502 with a printhead assembly 302 of the additive printing system 300. In an embodiment, as shown, the wall 502 may circumscribe or at least partially circumscribe a vertical axis (VA) of the tower structure 500. Each wall 502 may for example, be one of a plurality of print layers in an axially aligned arrangement to form the tower structure 500. In addition, as is described herein, the tower structure 500 may be formed using at least one cementitious material.

As depicted in the partial overhead view of the tower 500 illustrated in FIG. 6, the wall 502 may, in an embodiment, have an outer circumferential face 508 corresponding to each layer of the wall 502. The outer circumferential face 508 may have a maximal radial distance from the vertical axis (VA). The outer circumferential face 508 may, for example, be generally circular and circumscribing the vertical axis (VA).

In an embodiment, the wall 502 may have an inner circumferential face 510 corresponding to each layer of the wall 502. The inner circumferential face 510 may have a minimal radial distance from the vertical axis. The inner circumferential face 510 may, for example, be generally circular, and circumscribing the vertical axis.

As depicted in the overhead view (e.g., layer view) illustrated in FIG. 7, an embodiment of a reinforcement member 514 may be positioned on the first printed layer 512 (as depicted by arrow $A_1$). FIG. 6, therefore, illustrates the process of forming the tower 500 following placement and/or positioning of the reinforcement member 514 on the first printed layer 512. FIG. 6 also illustrates a portion of the second printed layer 516 deposited on the reinforcement member 514.

The reinforcement member 514 may, in an embodiment, include an inner rail 518, an outer rail 520, and/or a plurality of transverse members 522. Each transverse member 522 may have a first end 524 coupled to the inner rail 518. In an embodiment, each transverse member 522 may have a second end 526 coupled to the outer rail 520. It should be appreciated that the inner rail 518 and/or the outer rail 520 may have a shape corresponding to a horizontal shape of the first printed layer. For example, in an embodiment wherein the tower structure 500 has a generally cylindrical or conical shape, the inner rail 518 and/or the outer rail 520 may be generally circular. By way of an additional example, in an embodiment wherein the tower structure 500 has a generally polygonal shape, the inner rail 518 and/or the outer rail 520 may include a plurality of angles/corners joined by a plurality of straight and/or curved sections. In such an embodiment, the inner rail 518 and/or the outer rail 520 may have a shape which mirrors the plurality of angles/corners joined by the plurality of straight and/or curved sections.

As particularly depicted in FIGS. 6-7, in an embodiment, a midline reference curve (CM) may be defined for each layer of the tower structure 500. The midline reference curve (CM) may be equidistant between the outer circumferential face 508 and the inner circumferential face 510 for the layer. Accordingly, the midline reference curve (CM) may be generally circular, and at least partially circumscribe the vertical axis. It should be appreciated that the midline reference curve (CM) may represent a radial neutral point corresponding to the width/thickness (W) of the wall 502.

It also should be appreciated that the midline reference curves (CM) of the print layers of the wall 502 may have different actual midline perimeter lengths at various heights of the tower structure 500. For example, the tower structure 500 may taper with an increase in height. As a result, a midline reference curve (CM) of a print layer near the support surface 2 may have a greater actual midline perimeter length than the actual midline perimeter length of a midline reference curve (CM) adjacent the ultimate height of the tower structure 500.

Returning to FIG. 6, in an embodiment, the additive printing system 300 may include a support structure 304. The support structure 304 may extend from the ground and/or from the support surface 2 along a generally vertical direction (V). In an embodiment, the support structure 304 may include at least one vertical support component 306. As depicted, in an embodiment, the vertical support component(s) 306 may be located radially outward of the tower structure 500. However, in an additional embodiment, the vertical support component(s) 306 may be located radially inward of the wall 502 or supported above and over the wall (as shown in the embodiment of FIGS. 3-5, for example).

The vertical support component(s) 306 may, in an embodiment, support a horizontal support component 308 (as shown in the embodiment of FIG. 8), for example). The vertical support component(s) 306 and the horizontal support component 308 may, in an embodiment, be a truss-like structure (e.g., similar to a tower crane). However, the vertical support component(s) 306 and the horizontal support component 308 may be formed in the other suitable manner or have any other configuration according to alternative embodiments. The horizontal support component 308 may, in an embodiment, be rotatable about the vertical support component(s) 306. In an additional embodiment, the horizontal support component 308 may be movably coupled to the vertical support component(s) 306 so as to permit the horizontal support component 308 to move in the vertical direction (V).

In at least one embodiment, the vertical support component(s) 306 may be configured to have a height that increases in step with the tower structure 500 during the manufacturing thereof. In such an embodiment, additional segments may be combined with the vertical support component(s) 306 to raise the vertical support structure using a jacking system (for example, similar to that shown in the embodiment of FIGS. 3-5). In general, the jacking system may be positioned proximate the support surface 2 and may be configured for raising the vertical support component(s) 306 and inserting additional segments.

The support structure 304 may be configured to support at least one support arm 310 movably coupled thereto. The support arm(s) 310 may be configured to position at least one component of the additive printing system 300 adjacent to the tower structure 500. The support arm(s) 310 may also be configured to deliver power, air, cementitious material, form material, or other resources to the supported component. In an additional embodiment, the support arm(s) 310 may also be equipped with at least one optical sensor 334 (see FIG. 9) for detecting a position of the support arm(s) 310 relative to the tower structure 500.

The additive printing system 300 may include the printhead assembly 302 supported by the support structure 304. The printhead assembly 302 may be positioned over the support surface 2 or preceding layers of the wall 502 by at least one of the horizontal support component 308 and/or the support arm(s) 310. The printhead assembly 302 may include a print nozzle 312. The print nozzle 312 may be configured to direct and/or shape a flow of cementitious material during the additive printing of the tower structure 500.

As particularly depicted in FIG. 8, optical sensor(s) 334 may be a three dimensional scanner. In another embodiment, the optical sensor(s) 334 may be a non-contact scanner that utilizes cameras (e.g., a stereoscopic system) and/or lasers (e.g., a triangulation-based 3D laser scanner) to capture physical characteristics of the tower structure 500. In another embodiment, the optical sensor(s) 334 may comprise an image sensor (e.g., a camera or video sensor) and may be configured to leverage processor-based algorithmic models, machine learning, or convolutional neural networks to derive information from digital images, videos, and other visual inputs and to take actions or make recommendations based on that information. Moreover, the at least one optical sensor 334 may be integrated with the printhead assembly 302. However, in an additional embodiment, the optical sensor(s) 334 may be an independent element supported by the support structure 304.

Following the deposition of the first printed layer 512 of one or more printed layers 511 and placement and positioning of the reinforcement member(s) 514, the optical sensor(s) 334 may, in an embodiment, be employed to optically scan the printed layer being deposited over the reinforcement member(s) 514. Thus, in an embodiment, a controller 200 (see FIG. 9) may then generate (as depicted by arrow $A_2$) a three-dimensional map 336 of the printed layer being deposited, based on the optical scan. In addition, the controller 200 may, in an embodiment, determine the actual midline perimeter length of the first printed layer 512 based on the three-dimensional map 336 of the first printed layer 512.

In another embodiment, the controller 200 may, in an embodiment, record the actual physical dimensions and the particular placement, positioning, and orientation of the first reinforcement member(s) before and during an actual print path 332 of the printhead assembly 302. The actual print path 332 may be recorded by the controller 200 during deposition of a second printed layer 516 going over the first printed layer 512. For example, in an embodiment, the sensor(s) 334 may be utilized to continuously monitor the placement and positioning of the first reinforcement member(s) and the second printed layer 516. In an embodiment, a midline perimeter length needed for the second reinforcement member(s) may be determined. The second reinforcement member(s) may then be formed based, at least in part, on the actual midline perimeter which itself is based on the determined, tracked, and mapped position of the first reinforcement member(s).

Figure 9:
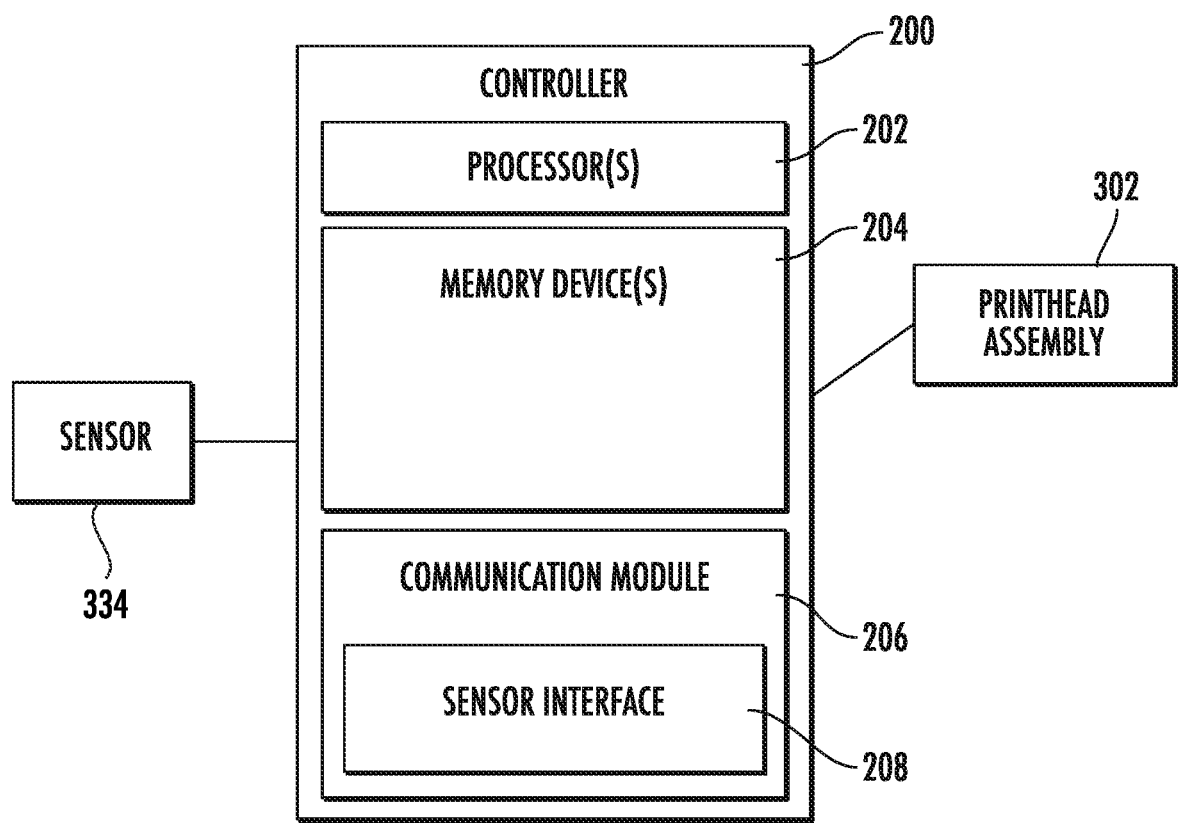
FIG. 9 illustrates a block diagram of an embodiment of a controller of an additive printing system according to the present disclosure.

Referring now to FIG. 9, a schematic diagram of an embodiment of suitable components of the controller 200 that may control the additive printing system 300 according to the present disclosure is illustrated. For example, as shown, the controller 200 may include one or more processor(s) 202 and associated memory device(s) 204 configured to perform a variety of computer-implemented functions (e.g., performing the methods, steps, calculations and the like and storing relevant data as disclosed herein). Additionally, the controller 200 may also include a communications module 206 to facilitate communications between the controller 200 and the various components of the additive printing system 300. Further, the communications module 206 may include a sensor interface 208 (e.g., one or more analog-to-digital converters) to permit signals transmitted from one or more sensors to be converted into signals that can be understood and processed by the processors 202. It should be appreciated that the sensor(s) may be communicatively coupled to the communications module 206 using any suitable means, such as a wired or a wireless connection. Additionally, the communications module 206 may also be operably coupled to a component of the additive printing system 300 so as to orchestrate the formation of the tower structure 500.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 200 to perform various functions including, but not limited to, manufacturing a tower structure, as described herein, as well as various other suitable computer-implemented functions.

In particular, in an embodiment, the communications module 206 may include a sensor interface 208 comprising one or more analog-to-digital converters to permit signals transmitted from one or more sensors or feedback devices to be converted into signals that can be understood and processed by the processor(s) 202. It should be appreciated that these sensors may be communicatively coupled to the communications module 206 using any suitable means, e.g., via a wired or wireless connection using any suitable wireless communications protocol known in the art. The processor 202 may also be configured to compute advanced control algorithms and communicate to a variety of Ethernet or serial-based protocols (Modbus, OPC, CAN, etc.).

Figure 10:
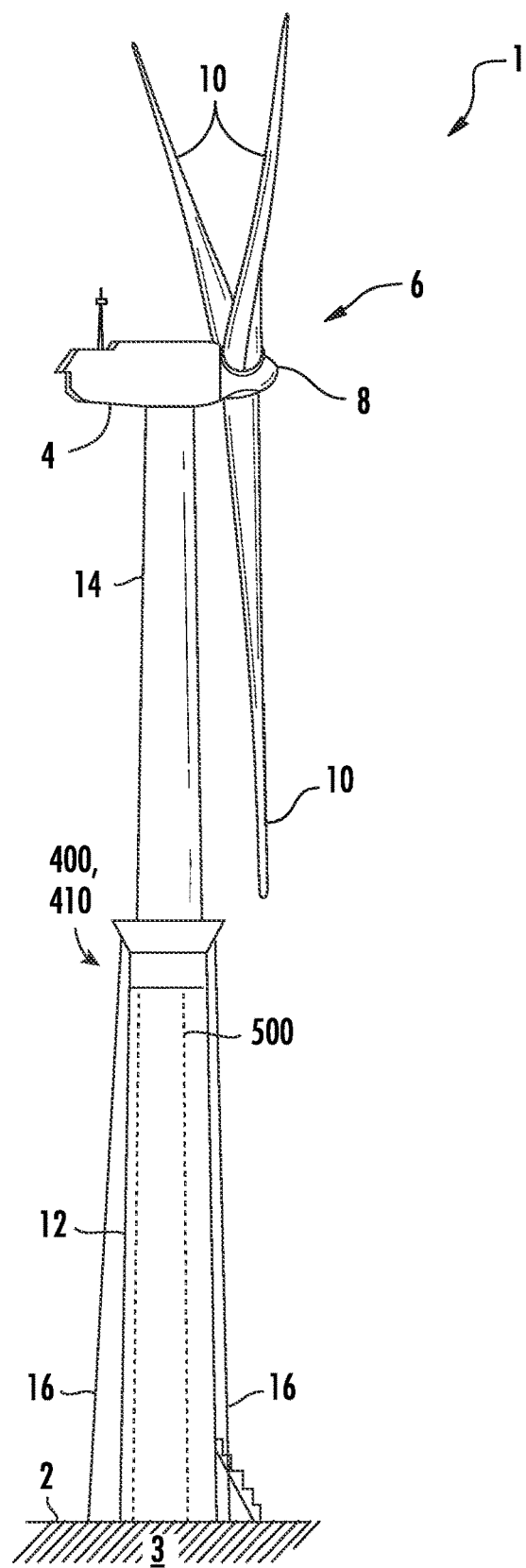
FIG. 10 illustrates a perspective view of an embodiment of a wind turbine with a hybrid tower structure according to the present disclosure.

FIG. 10 illustrates a perspective view of another embodiment of a tower structure 500 according to the present disclosure. As depicted in FIG. 10, the tower structure 500 is a hybrid tower structure formed from a lower tower section 12 section that is typically made from concrete. In a particular embodiment according to the invention, the lower tower section 12 is formed with an additive manufacturing process. The tower structure 500 also includes an upper tower section 14, which may be formed as a steel cylindrical or lattice-frame structure or as one or more printed layers formed of concrete, and a base 400 holding thereon, for example, the steel cylindrical or lattice-frame structure or the one or more printed layers.

In particular, in the illustrated embodiment, the base 400 is a transition system 410 to connect the upper tower section 14 to the lower tower section 12 in a manner that effectively manages and distributes the stresses, particularly tensile stresses, imparted to the lower tower section 12. The tower structure 500 includes a plurality of tension tendons 16, which may comprise cables or the like, connected around the transition system 410 and anchored to the support surface 2 around the bottom end of the lower tower section 12. For example, in the illustrated embodiment, the tension tendons 16 are external to the tower section 12. However, in another embodiment, or optionally in the illustrated embodiment, the tension tendons 16 are internal to the lower tower section 12.

The purpose and use of such tension tendons 16 with hybrid tower structures 500 is well-known in the field and need not be described in detail herein. The base 400 is described in greater detail herein.

Figure 11:
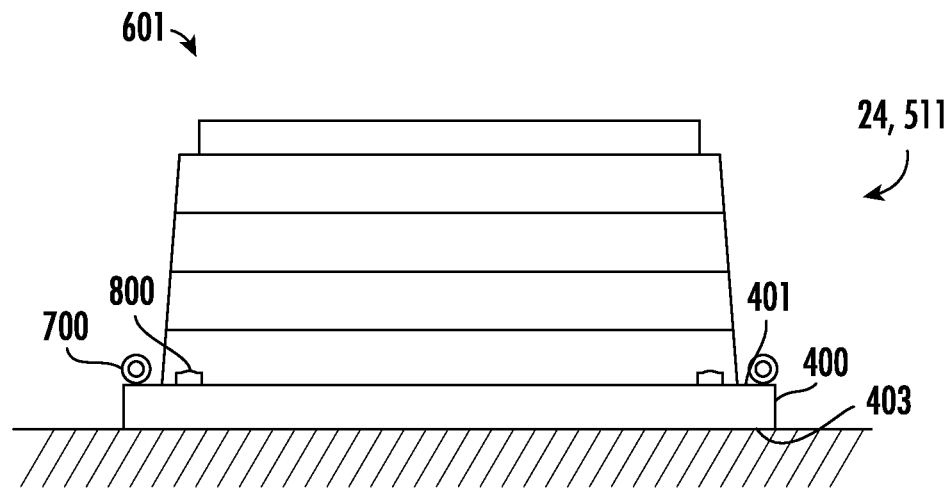
FIG. 11 illustrates a side view of a tower section of a tower structure of a wind turbine according to the present disclosure.
Figure 12:
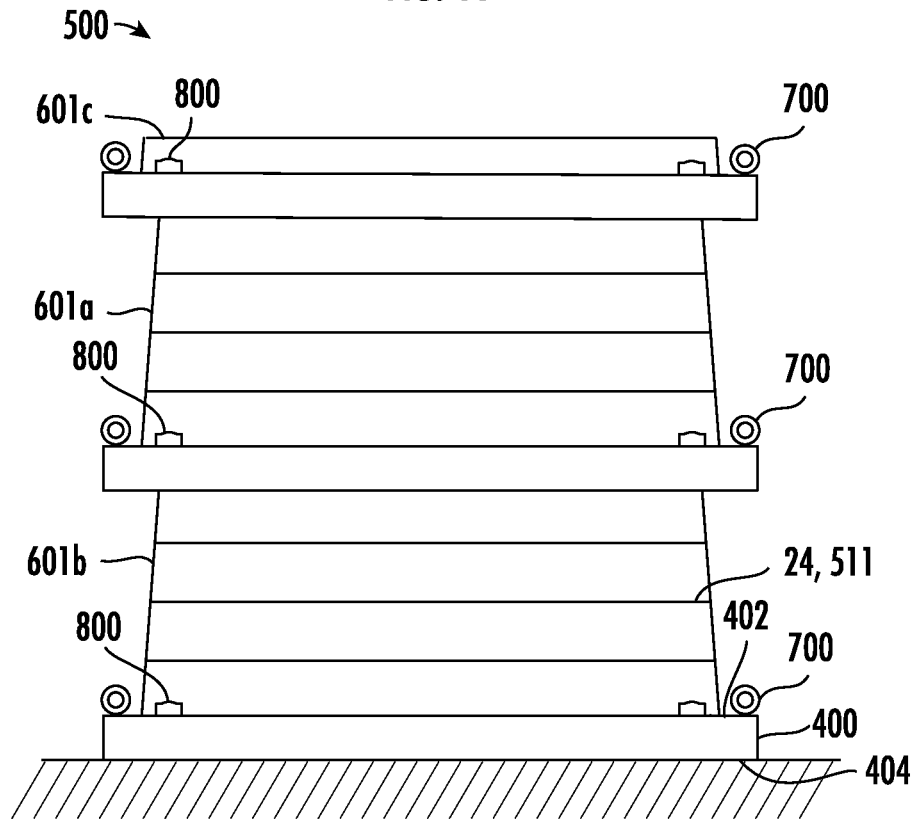
FIG. 12 illustrates a side view of a tower structure with a plurality of stacked tower sections of FIG. 11 according to the present disclosure.

Referring now to FIGS. 11 and 12, various views of an embodiment of a tower section of a tower structure are illustrated, in particular, a tower section 601 of the tower structure 500. FIG. 11 illustrates a side view of the tower section 601. FIG. 12 illustrates a side view of the tower structure 500 with a plurality of stacked tower sections, in particular, a stacked tower section 601a and an adjacent stacked tower section 601b (for example, 601c is only partially shown; 601d, etc. are not shown).

In the illustrated embodiment, at least one tower section of the plurality of stacked tower sections includes a wall element 24 having one or more printed layers 511, a base 400 holding thereon the one or more printed layers 511, and a lift connection element 700 installed on the base 400. The base 400 has a surface 401 for directly printing and depositing thereon the one or more printed layers 511. In this way, the base 400 is a fixed base for the at least one tower section 601 in that the one or more printed layers 511 of the wall element 24 are deposited permanently onto the surface 401—forming a joint 800 at the interface of the base 400 and the wall element 24. In another embodiment, the lift connection element 700 may be installed on at least one of the wall element 24 or the base 400 (see FIGS. 19-20, for example) and allow for lifting and moving of the wall element 24 and/or the base 400. For example, during assembly of the tower section 601 and/or the tower structure 500, the one or more printed layers 511 may be printed and deposited separate from the base 400 and the lift connection element 700 may be used to subsequently place the wall element 24 on the base 400 to form the joint 800.

Returning to the illustrated embodiment of FIGS. 11 and 12, the lift connection element 700 is a lifting lug. More specifically, the base 400 is a cast or additively-manufactured pallet or stage for holding or printing thereon the one or more printed layers 511, and the base 400 includes a plurality of lifting lugs. The base 400 also is configured as an annular ring having the lift connection elements 700 installed about the outer periphery of the ring-shaped structure. In another embodiment, the lift connection element 700 is a plurality of reinforced wall faces of the base 400 and the plurality of reinforced wall faces define a lifting pocket(s) for a lifting yoke (see FIGS. 19-20, for example). In another embodiment, each successive tower section 601 of the tower structure 500 includes a base 400 and a tapered wall element 24, and wherein each successive base has a sequentially smaller diameter such that the tower structure 500 is defined by a tapered structure.

Figure 13A:
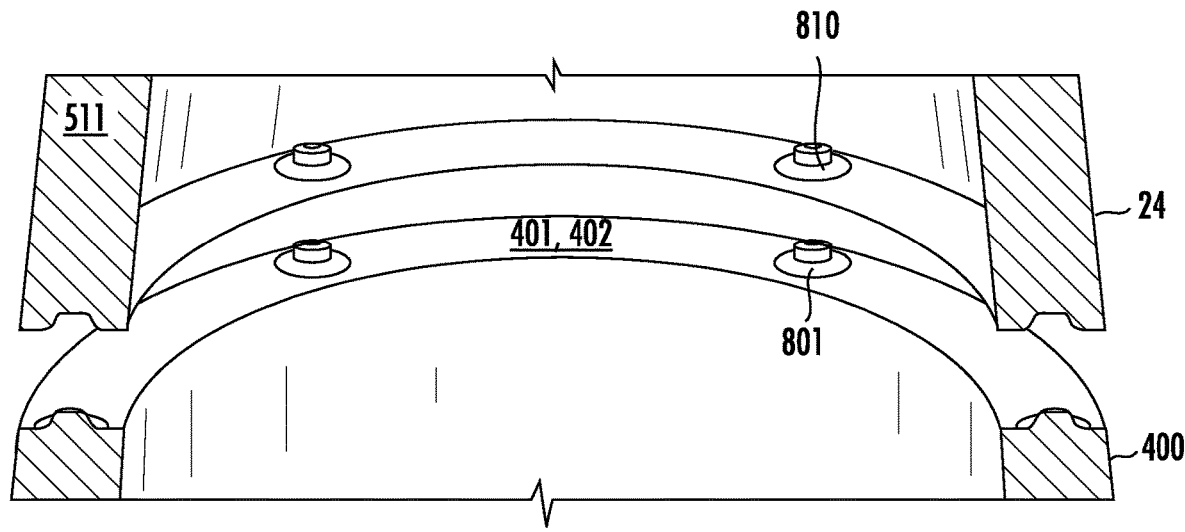
FIG. 13A illustrates an exploded, perspective cross sectional view of a joint of the tower structure of FIG. 12 according to the present disclosure.
Figure 13B:
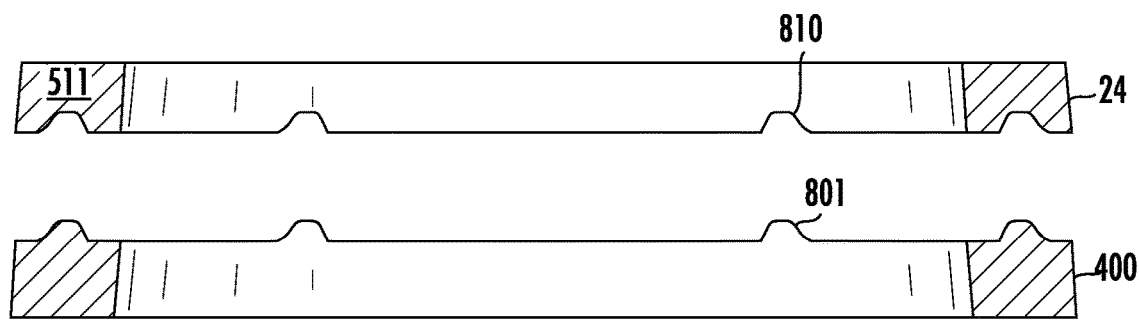
FIG. 13B illustrates a cross sectional view of the joint of FIG. 13A according to the present disclosure.

Moreover, in the illustrated embodiment of FIGS. 11 and 12, the base 400 has a top side 402 including an alignment element 801. The surface 401 of the top side 402 of the base 400 holds the wall element 24 comprising the one or more printed layers 511. Moreover, the wall element 24 has an alignment element 810 corresponding to the alignment element 801 of the base 400. For example, as shown particularly in the exploded, perspective cross sectional view illustrated in FIG. 13A and the cross sectional view illustrated in FIG. 13B, the joint 800 of FIGS. 11 and 12 comprises the interface of the wall element 24 and the base 400 including the alignment element 810 corresponding to the alignment element 801 (e.g., the alignment element 810 receives the alignment element 801).

Figure 14A:
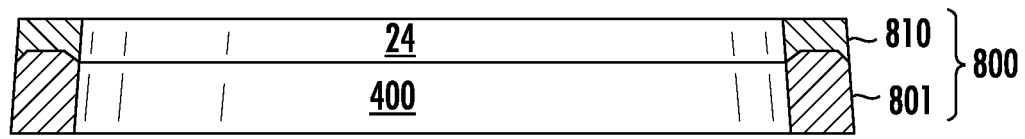
FIG. 14A illustrates a cross sectional view of a joint of a tower structure according to the present disclosure.
Figure 14B:
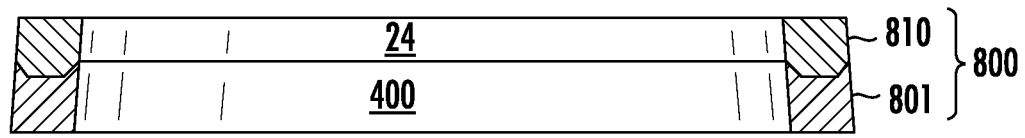
FIG. 14B illustrates a cross sectional view of a joint of a tower structure according to the present disclosure.
Figure 14C:
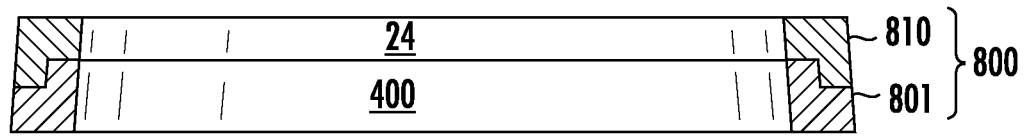
FIG. 14C illustrates a cross sectional view of a joint of a tower structure according to the present disclosure.

Moreover, and as shown particularly in FIG. 14A-14C, the joint 800, the alignment element 801, and the alignment element 810 may have any suitable configuration. For example, FIG. 14A illustrates a different variation of the embodiment of the joint 800 illustrated in FIGS. 13A and 13B. The joint 800 as illustrated in FIG. 14A has an alignment element 801 that is received by the alignment element 810 and, unlike the alignment element 801 illustrated in FIGS. 13A and 13B, extends about the entire ring structure of the base 400. FIG. 14B illustrates another embodiment of the joint 800 having an alignment element 810 that is received by the alignment element 801. FIG. 14C illustrates another embodiment of the joint 800 having an alignment element 801 that interlocks with the alignment element 810.

Returning to the illustrated embodiment of FIGS. 11 and 12, the base 400 also has a bottom side 404 including an alignment element 802. A surface 403 of the bottom side 404 of the stacked tower section 601*a* defines a cavity receiving at least a top layer of the one or more printed layers 511 of the wall element 24 of the adjacent stacked tower section 601*b* of the tower structure 500. In this way, the interface of the wall element 24 of the adjacent stacked tower section 601*b* and the alignment element 802 of the base 400 of the stacked tower section 601*a* form the joint 800. Also in this way, a plurality of the tower sections 601 can be lifted via the lift connection element(s) 700, stacked, and aligned to form the tower structure 500.

Referring now to FIGS. 15-17, various views of another embodiment of a tower section of a tower structure are illustrated, in particular, a tower section 602 of the tower structure 500 having a transition system 410. Specifically, FIG. 15 illustrates a cross sectional view of the tower section 602 having a base 400 as the transition system 410 of the tower structure 500. FIG. 16 illustrates a cross sectional view of the tower structure 500 having the transition system 410 between two (2) stacked tower sections, in particular, a stacked tower section 602*a* and an adjacent stacked tower section 602*b*. FIG. 17 illustrates an exploded, cross sectional view of the interface of the wall element 24 of the stacked tower section 602*a*, the base 400, and the wall element 24 of the adjacent stacked tower section 602*b*.

More specifically, in the illustrated embodiment, at least one tower section 602 of the plurality of stacked tower sections includes a wall element 24 having one or more printed layers 511, and the transition system 410. The transition system 410 holds the one or more printed layers 511. In particular, in the illustrated embodiment, the transition system 410 has a top side 402 including a surface 401 holding the one or more printed layers 511, and a poured concrete or cast material tubular wall 412. The poured concrete or cast material tubular wall 412 and the surface 401 of the top side 402 define a cavity 414, with the cavity 414 receiving at least one layer of the one or more printed layers 511 of the stacked tower section 602*a*. The transition system 410 also has a bottom side 404 including a surface 403 and a poured concrete or cast material tubular wall 413 configured as a constraining ring. The poured concrete or cast material tubular wall 413 and the surface 403 of the bottom side 404 define a cavity 416, with the cavity 416 receiving at least a top layer of the one or more printed layers 511 of the adjacent stacked tower section 602*b* (best shown in FIG. 16).

During assembly of the illustrated tower structure 500, the surface 403 of the bottom side 404 of the transition system 410 flattens at least the top layer of the one or more printed layers 511 of the adjacent stacked tower section 602*b*, and the poured concrete or cast material tubular 413 as the constraining ring facilitates shaping at least the top layer of the wall element 24 of the adjacent stacked tower section 602*b*. In another embodiment of the transition system 410, the at least one tower section 602 also includes a lift connection element 700 installed on (or integral to) at least the wall element 24 or the transition system 410 of the tower section 602. Moreover, in another embodiment of the transition system 410, the transition system 410 further comprises one or more reinforcement members 420 extending into at least the cavity 414 of the top side 402 or the cavity 416 of the bottom side 404.

Figure 18A:
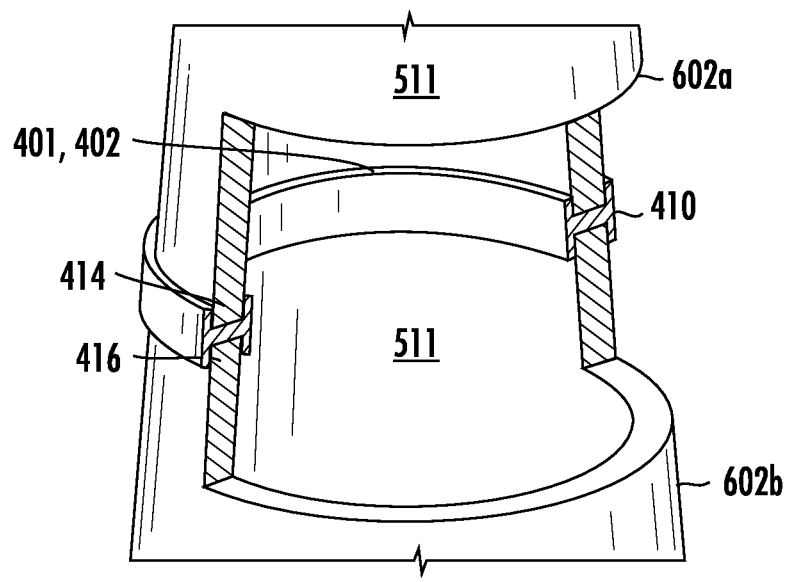
FIG. 18A illustrates a perspective cross sectional view of a transitional system of a tower structure according to the present disclosure.
Figure 18B:
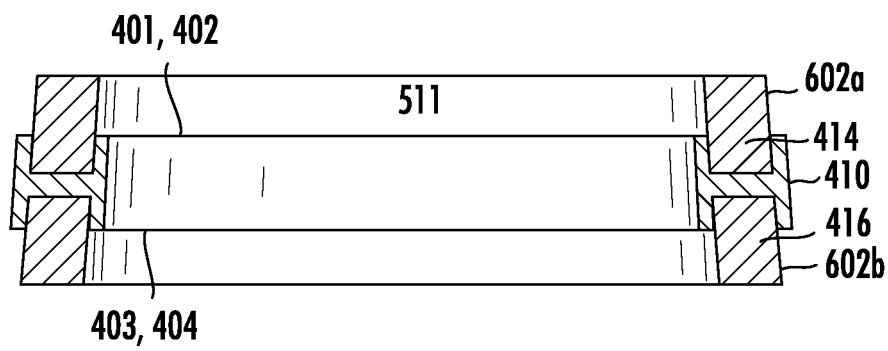
FIG. 18B illustrates a cross sectional view of the transition system of FIG. 18A according to the present disclosure.

FIGS. 18A and 18B illustrate a different variation of the embodiment of the transition system 410 shown in FIGS. 15-17. The transition system 410 illustrated in FIGS. 18A and 18B has the top side 402 surface 401 holding the one or more printed layers 511 of the stacked tower section 602*a*, and has the bottom side 404 surface 403 interfacing with the one or more printed layers 511 of the adjacent stacked tower section 602*b* and, unlike the transition system 410 illustrated in FIG. 15-17, does not have the poured concrete or cast material tubular walls 412 or 413. Instead, the top side 402 surface 403 defines the cavity 414, and the cavity 414 receives at least one layer of the one or more printed layers 511 of the stacked tower section 602*a*. Moreover, the bottom side 404 surface 403 defines the cavity 416, and the cavity receives at least the top layer of the one or more printed layers 511 of the adjacent stacked tower section 602*b*.

Figure 19A:
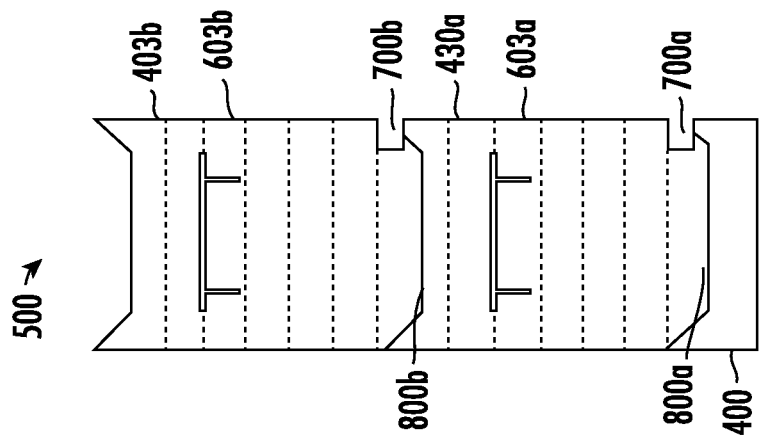
FIG. 19A illustrates a cross sectional view of a tower section of a tower structure of a wind turbine according to the present disclosure.
Figure 19B:
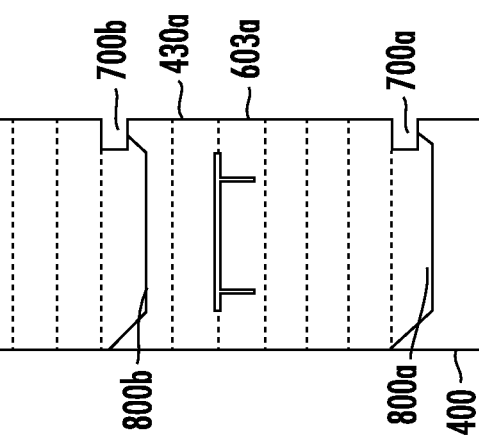
FIG. 19B illustrates a cross sectional view of a cap of a tower structure on a cap mold according to the present disclosure.
Figure 19C:
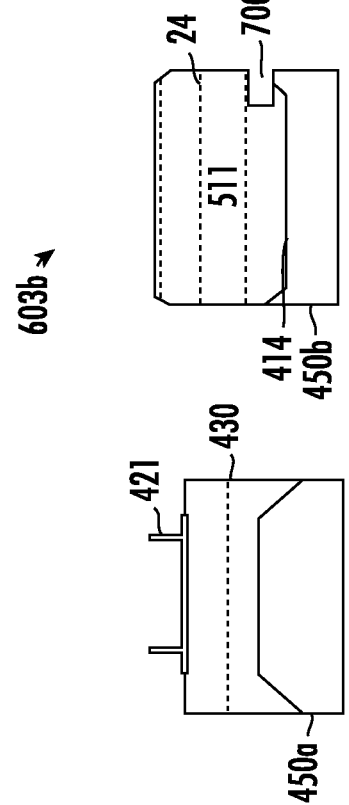
FIG. 19C illustrates a cross sectional view of a wall element of a tower section of a tower structure on a wall element mold according to the present disclosure.
Figure 20:
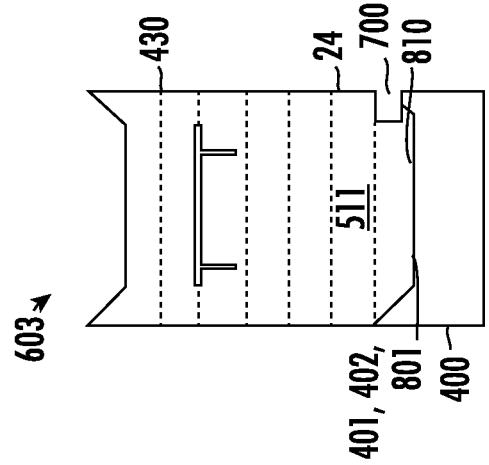
FIG. 20 illustrates a cross sectional view of a tower structure with at least one tower section of FIG. 19A according to the present disclosure.

Referring now to FIGS. 19A, 19B, 19C, and 20, various views of another embodiment of a tower section of a tower structure are illustrated, in particular, a tower section 603 of the tower structure 500. The tower structure has a cap 430. The tower section 603 and the cap 430 are formed with molds 450, specifically, a cap mold 450*a* and a wall element mold 450*b* respectively. FIG. 19A illustrates a cross sectional view of the tower section 603, in particular, the tower section 603*a* having the base 400. FIG. 19B illustrates a cross sectional view of the cap 430 printed and deposited on the cap mold 450*a*. FIG. 19C illustrates a cross sectional view of another tower section 603*b*, similar to the tower section 603*a*, but being printed and deposited on the wall element mold 450*b*. FIG. 20 illustrates a side view of the tower structure 500 having two (2) stacked tower sections 603, in particular, a stacked tower section 603*a* and an adjacent stacked tower section 603*b*.

More specifically, in the illustrated embodiment of FIG. 19A, the wall element 24 of the tower section 603 has one or more printed layers 511 and a lift connection element 700 integral to the wall element 24. The base 400 holds the wall element 24 and is for directly printing and depositing thereon the one or more printed layers 511—forming a joint 800*a*. In this way, the interface of the one or more printed layers 511 of the wall element 24 and a surface 401 of a top side 402 of the base 400 define, at least in part, the joint 800*a*. However, as illustrated in FIGS. 19A, 19B, 19C, and 20, during assembly of the tower sections 603 and/or the tower structure 500, the one or more printed layers 511 are printed and deposited separate from the base 400 (on the wall element mold 450*b*, for example) and then subsequently placed on the base 400 (to form the joint 800*a*) or placed on a cap 430 on a tower structure 500 to form a joint 800*b*.

Even more specifically, in the illustrated embodiment of FIG. 19A, the surface 401 of the top side 402 of the base 400 has an alignment element 801, and the wall element 24 has an alignment element 810 corresponding to the alignment element 801 (e.g., the alignment element 801 receives the alignment element 810). The surface 401 of the top side 402 holds the wall element 24 and is for directly printing and depositing thereon the one or more printed layers 511. In this way, the interface of the one or more printed layers 511 of the wall element 24 (including the alignment element 801) and the surface 401 of the base 400 (including of the alignment elements 81) define the joint 800*a*. In another embodiment, the alignment element 801 may be configured as a slide resistance element that prevents sliding of the alignment element 810 when received by the alignment element 801.

Even more specifically, in the illustrated embodiment of FIGS. 19A and 19C, the surface 401 of the top side 402 of the base 400 defines a cavity 414 receiving at least one layer of the one or more printed layers 511 of the wall element 24 of the tower section 603. Moreover, the wall element 24 has a formed portion defining the least one layer of the one or more printed layers 511 of the wall element 24 received by the cavity 414. The formed portion of the well element 24 may be formed using additive manufacturing techniques, near-net-shape (NNS) rolling techniques, grinding techniques, molding/forming techniques, and casting techniques, for example, when the material of the one or more printed layers 511 are green, soft, fully cured, partially cured, etc. In this way, the least one layer of the one or more printed layers 511 are formed to be received by the cavity 414. In another embodiment, the wall element 24 has at least a bottom layer defining a cavity essentially equivalent to the cavity 414, but the cavity is for receiving at least a top layer of the one or more printed layers 511 of an adjacent stacked tower section 603*b* of the tower structure 500.

Figure 21:
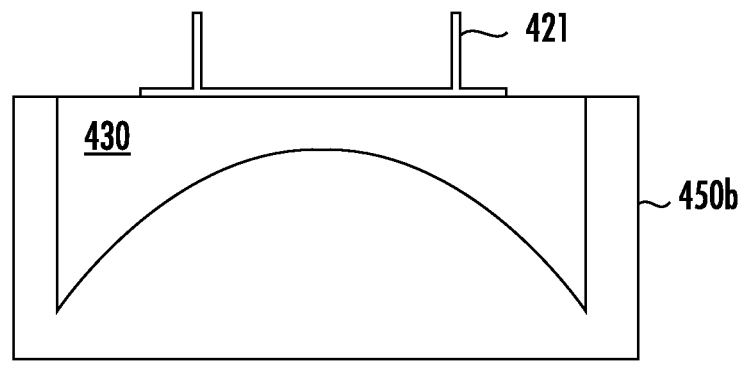
FIG. 21 illustrates a cross sectional view of a cap mold according to the present disclosure.

Moreover, and as shown particularly in FIG. 21, other embodiments of the wall element mold 450*b* may have any suitable configuration. For example, FIG. 21 illustrates a different variation of the embodiment of the wall element mold 450*b* shown in FIGS. 19A, 19B, 19C, and 20. The wall element mold 450*b* as illustrated in FIG. 21 has a rounded geometry that minimizes sharp edges and sharp angles in the bases 400 produced thereon.

Returning to the illustrated embodiment of FIG. 19B, the cap 430 is printed and deposited on the cap mold 450*a*. More specifically, during assembly of the tower sections 603 and/or the tower structure 500, one or more layers are printed and deposited on the cap mold 450*a* to form the cap 430. The cap 430 is then subsequently placed on the one or more printed layers 511 of the tower section 603 when the material of the one or more printed layers 511 are green, soft, fully cured, partially cured, etc. to form the tower section 603 ready to receive an adjacent stacked tower section 603*b*, or shaped and placed at the top of the tower structure 500 to cap the tower structure 500. In this way, in another embodiment, the cap 430 also has a formed portion that may be formed using additive manufacturing techniques, near-net-shape (NNS) rolling techniques, grinding techniques, molding/forming techniques, and casting techniques, for example, when the material of the one or more printed layers 511 are green, soft, fully cured, partially cured, etc. The cap 430 may be formed to be received by a cavity essentially equivalent to the cavity 414, but the cavity is for receiving at least a top layer of the print layers of the cap 430.

Figure 22:
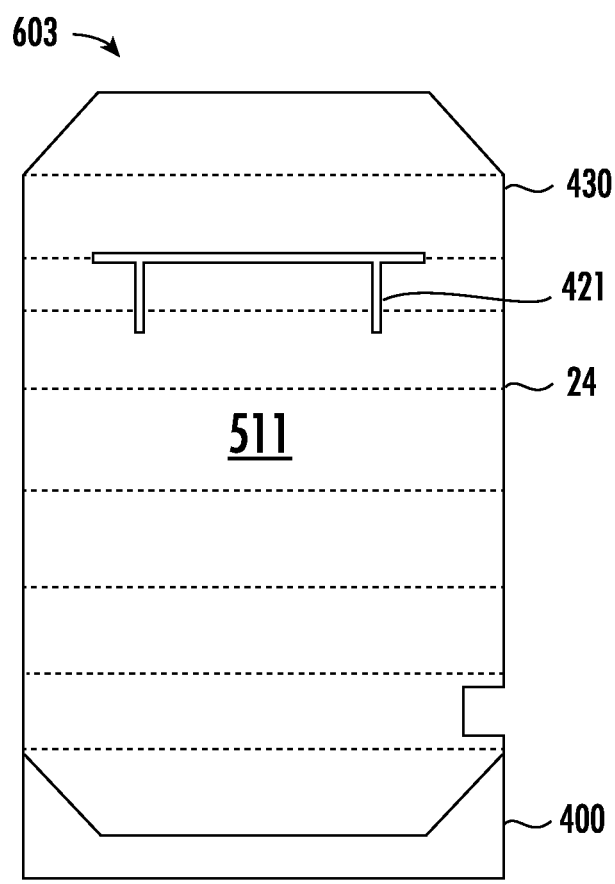
FIG. 22 illustrates a cross sectional view of a tower section of a tower structure of a wind turbine according to the present disclosure.

Moreover, and as shown particularly in FIG. 22, other embodiments of the cap 430 may have any suitable configuration. For example, FIG. 22 illustrates a cap 430, that was printed and deposited on the cap mold 450*a* of FIG. 19C, now held on the wall element 24 of the tower section 603. The cap 430 has a formed portion. More specifically, in the illustrated embodiment, the cap 430 and has a ring of reinforcement members 421 such that, during assembly of the tower sections 603 and/or the tower structure 500, the cap 430 may be placed on and engaged to the one or more printed layers 511 of the tower section 603 when the material of the one or more printed layers 511 are green, soft, fully cured, partially cured, etc. In another embodiment, the cap 430 is entirely formed using additive manufacturing techniques, near-net-shape (NNS) rolling techniques, grinding techniques, molding/forming techniques, and casting techniques, for example, when the material of the one or more printed layers 511 are green, soft, fully cured, partially cured, etc. In another embodiment, the ring of reinforcement members 421 may be any other structure or shape.

Figure 23A:
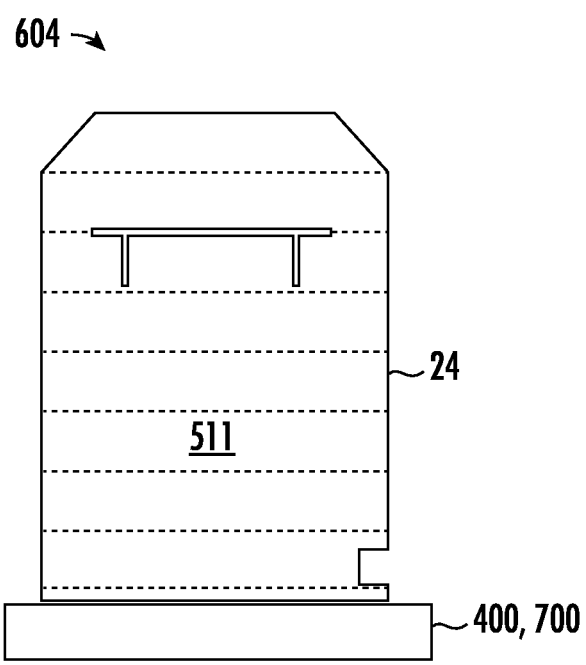
FIG. 23A illustrates a cross sectional view of a tower section of a tower structure of a wind turbine according to the present disclosure.
Figure 23B:
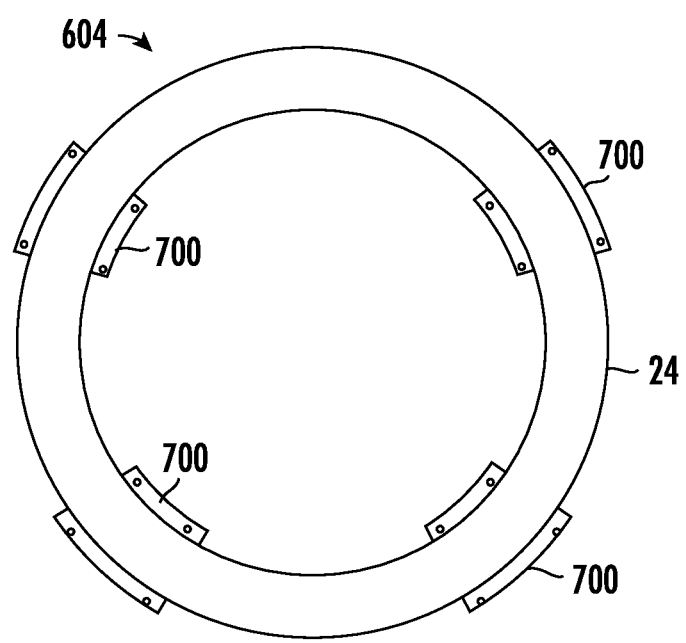
FIG. 23B illustrates a top view of the tower section of FIG. 23A according to the present disclosure.

Referring now to FIGS. 23A and 23B, various views of another embodiment of a tower section of a tower structure are illustrated, in particular, a tower section 604 of the tower structure 500. The tower section 604 is similar to the tower section 603 of FIG. 22 but includes another embodiment of a base 400. In the illustrated embodiment of FIGS. 23A and 23B, the base 400 is a plurality of fixed lift connection elements 700 each configured as cast steel lifting plates and each having a top surface 401 holding thereon the one or more printed layers 511 of the wall element 24. The fixed lift connection elements 700 are for detachably engaging with a lifting device during stacking of the plurality of tower sections 604. The fixed lift connection elements 700 are integral to at least the one or more printed layers 511 (for example, at least a bottom layer of the one or more printed layers) of the wall element 24.

Figure 24:
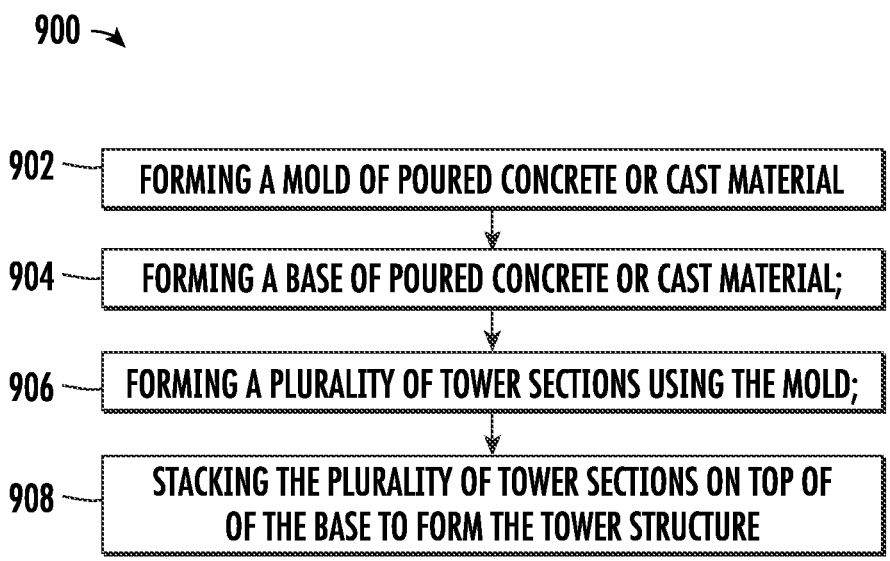
FIG. 24 illustrates a flow diagram of an embodiment of a method for assembling an additively manufactured structure according to the present disclosure.

Referring now to FIG. 24, a flow diagram of an embodiment of a method 900 of manufacturing a tower structure is provided. In particular, the method 900 can be used to form the tower structure 500 of FIGS. 11-23 using the additive printing system 40 of FIGS. 3-5 or the additive printing system 300 of FIG. 6-8, or to form any other suitable structure, tower, or tall structure using any other suitable additive printing system. In this regard, for example, the controller 200 of FIG. 9 may be configured for implementing the method 900. However, it should be appreciated that the method 900 is discussed herein only to describe aspects of the present disclosure and is not intended to be limiting.

Further, though FIG. 24 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 500 and the additive printing system 40, 300 as an example, it should be appreciated that these methods may be applied to the operation of additive printing system to form any suitable tower structure.

In particular, as shown at (902), the method 900 includes forming a mold of poured concrete or cast material.

As shown at (904), the method 900 includes forming a base of poured concrete or cast material.

As shown at (906), the method 900 includes forming a plurality of tower sections using the mold. In certain embodiments, the method 900 may also include printing and depositing one or more printed layers on a top side of the mold to form a wall element, using the top side of the mold comprising an alignment mold. In this way, any wall element(s) printed and deposited thereon results in a wall element with an alignment element. In certain embodiments, the method 900 may also include installing a lift connection element on at least the wall element or the base.

As shown at (908), the method 900 includes and stacking the plurality of tower sections on top of the base to form the tower structure. In certain embodiments, the method 900 may also include lifting, via the lift connection element(s) using a lifting mechanism (e.g. a crane or hydraulic light), each of the plurality of tower sections. In certain embodiments, the method 900 may also include aligning the at least one tower section and an adjacent tower section via the alignment element(s). In certain embodiments, the method 900 may also include stacking the at least one tower section on the adjacent tower section.

Further aspects of the present disclosure are provided by the subject matter of the following clauses:

A tower structure, comprising: a plurality of stacked tower sections, wherein at least one tower section of the plurality of stacked tower sections comprises: a wall element comprising one or more printed layers formed of concrete; and a base holding thereon the one or more printed layers, the base formed of poured concrete or cast material; wherein at least one of the wall element or the base comprises a lift connection element for detachably engaging with a lifting device during stacking of the plurality of stacked tower sections.

The tower structure of the preceding clause, wherein the base is a fixed base comprising a surface for printing and depositing thereon the one or more printed layers.

The tower structure of the preceding clause, wherein the fixed base comprises the lift connection element, and wherein the lift connection element is a lifting lug.

The tower structure of any of the preceding clauses, wherein the fixed base comprises the lift connection element, and wherein the lift connection element is a plurality of reinforced wall faces defining a lifting pocket for a lifting yoke.

The tower structure of any of the preceding clauses, wherein the fixed base further comprises an alignment element for aligning the plurality of stacked tower sections during stacking thereof.

The tower structure of the preceding clause, wherein the alignment element is a bottom surface of the fixed base, the bottom surface defining a cavity, the cavity receiving at least a top layer of one or more printed layers of an adjacent stacked tower section of the plurality of stacked tower sections.

The tower structure of any of the preceding clauses, and wherein the fixed base comprises a transition system connecting the at least one tower section with an adjacent stacked tower section of the plurality of stacked tower sections, the transition system comprising: a top side comprising: the surface of the base holding the one or more printed layers; and a poured concrete or cast material tubular wall, the poured concrete or cast material tubular wall and the surface of the top side of the base defining a cavity, the cavity receiving at least one layer of the one or more printed layers; and a bottom side comprising: a surface; and a poured concrete or cast material tubular wall defining a constraining ring, the constraining ring and the surface of the bottom side of the base defining a cavity, the cavity receiving at least a top layer of one or more printed layers of the adjacent stacked tower section, the surface of the bottom side for flattening at least the top layer of the one or more printed layers of the adjacent stacked tower section.

The tower structure of the preceding clause, wherein the fixed base comprises the lift connection element, and wherein the transition system further comprises one or more reinforcement members extending into at least one of the cavity of the bottom side or the cavity of the top side of the transition system.

The tower structure of any of the preceding clauses: wherein the base comprises a top side comprising an alignment element, the top side of the base for holding the wall element comprising the one or more printed layers; and wherein the wall element comprises an alignment element corresponding to the alignment element of the base, the alignment element of the wall element and the alignment element of the base aligning the wall element with the base.

The tower structure of the preceding clause: wherein the alignment element of the wall element is at least a top layer of the one or more printed layers; and wherein the alignment element of the base is a cavity, the cavity receiving at least the top layer of the one or more printed layers of the wall element.

The tower structure of the preceding clause, wherein at least the top layer of the one or more printed layers is a formed portion of the wall element, the cavity receiving the formed portion of the wall element.

The tower structure of any of the preceding clauses: wherein at least a bottom layer of the one or more printed layers defines a cavity, the cavity receiving at least a top layer of one or more printed layers of an adjacent stacked tower section of the plurality of stacked tower sections.

The tower structure of the preceding clause, wherein the cavity of the one or more printed layers of the wall element is a slide resistance element for the plurality of stacked tower sections.

The tower structure of the preceding clause, wherein the tower structure further comprises a cap section topping the plurality of stacked tower sections.

The tower structure of any of the preceding clauses: wherein the lift connection element is a fixed lift connection element for the at least one tower section; and wherein the fixed lift connection element is integral with at least the top layer of the one or more printed layers.

A tower structure, comprising: a plurality of stacked tower sections, wherein at least one tower section of the plurality of stacked tower sections comprises: a wall element comprising one or more printed layers formed of concrete; and a fixed lift connection element for detachably engaging with a lifting device during stacking of the plurality of stacked tower sections, the fixed lift connection element integral to at least the wall element, the fixed lift connection element comprising a surface holding thereon the one or more printed layers of the wall element.

The tower structure of the preceding clause, wherein the fixed lift connection element is a steel lifting plate integral to at least the wall element.

The tower structure of the preceding clause, wherein the steel lifting plate is integral to at least a bottom layer the one or more printed layers of the wall element.

A method of assembling a tower structure, the method comprising: forming a mold of poured concrete or cast material; forming a base of poured concrete or cast material; forming a plurality of tower sections using the mold; and stacking the plurality of tower sections on top of the base to form the tower structure; wherein forming at least one tower section of the plurality of tower sections comprises: printing and depositing one or more printed layers on a top side of the mold to form a wall element, the top side of the mold comprising an alignment mold such that the wall element printed and deposited thereon comprises an alignment element; and installing a lift connection element on the wall element; wherein stacking the plurality of tower sections to form the tower structure comprises: lifting, via the lift connection element, each of the plurality of tower sections; aligning the at least one tower section and an adjacent tower section via the alignment element; and stacking the at least one tower section on the adjacent tower section.

The method of the preceding clause, wherein stacking the plurality of tower sections to form the tower structure further comprises capping the stacked plurality of tower sections using a cap section.

This written description uses embodiments to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower structure, comprising:
a plurality of stacked tower sections, wherein at least one tower section of the plurality of stacked tower sections comprises:
 a wall element comprising one or more printed layers formed of concrete; and
 a base supporting thereon the one or more printed layers, the base formed of poured concrete or cast material;
 wherein at least one of the wall element or the base comprises a lift connection element for detachably engaging with a lifting device during stacking of the plurality of stacked tower sections,
 wherein the base comprises a transition system connecting the at least one tower section with an adjacent stacked tower section of the plurality of stacked tower sections, the transition system comprising:
  a top side comprising:
   the surface of the base holding the one or more printed layers; and
   a poured concrete or cast material tubular wall, the poured concrete or cast material tubular wall and the surface of the top side of the base defining a cavity, the cavity receiving at least one layer of the one or more printed layers; and
  a bottom side comprising:
   a surface; and
   a poured concrete or cast material tubular wall defining a constraining ring, the constraining ring and the surface of the bottom side of the base defining a cavity, the cavity receiving at least a top layer of one or more printed layers of the adjacent stacked tower section, the surface of the bottom side for flattening at least the top layer of the one or more printed layers of the adjacent stacked tower section.

2. The tower structure of claim 1, wherein the base is a fixed base comprising a surface for printing and depositing thereon the one or more printed layers.

3. The tower structure of claim 2, wherein the fixed base comprises the lift connection element, and wherein the lift connection element is a lifting lug.

4. The tower structure of claim 2, wherein the fixed base comprises the lift connection element, and wherein the lift connection element is a plurality of reinforced wall faces defining a lifting pocket for a lifting yoke.

5. The tower structure of claim 2, wherein the fixed base further comprises an alignment element for aligning the plurality of stacked tower sections during stacking thereof.

6. The tower structure of claim 5, wherein the alignment element is a bottom surface of the fixed base, the bottom surface defining a cavity, the cavity receiving at least a top layer of one or more printed layers of an adjacent stacked tower section of the plurality of stacked tower sections.

7. The tower structure of claim 1, wherein the fixed base comprises the lift connection element, and wherein the transition system further comprises one or more reinforcement members extending into at least one of the cavity of the bottom side or the cavity of the top side of the transition system.

8. The tower structure of claim 1:
wherein the base comprises a top side comprising an alignment element, the top side of the base for holding the wall element comprising the one or more printed layers; and
wherein the wall element comprises an alignment element corresponding to the alignment element of the base, the alignment element of the wall element and the alignment element of the base aligning the wall element with the base.

9. The tower structure of claim 8:
wherein the alignment element of the wall element is at least a top layer of the one or more printed layers; and
wherein the alignment element of the base is a cavity, the cavity receiving at least the top layer of the one or more printed layers of the wall element.

10. The tower structure of claim 9, wherein at least the top layer of the one or more printed layers is a formed portion of the wall element, the cavity receiving the formed portion of the wall element.

11. The tower structure of claim 9:
wherein at least a bottom layer of the one or more printed layers defines a cavity, the cavity receiving at least a top layer of one or more printed layers of an adjacent stacked tower section of the plurality of stacked tower sections.

12. The tower structure of claim 11, wherein the cavity of the one or more printed layers of the wall element is a slide resistance element for the plurality of stacked tower sections.

13. The tower structure of claim 11, wherein the tower structure further comprises a cap section topping the plurality of stacked tower sections.

14. The tower structure of claim 9:
wherein the lift connection element is a fixed lift connection element for the at least one tower section; and
wherein the fixed lift connection element is integral with at least the top layer of the one or more printed layers.

15. A tower structure, comprising:
a plurality of stacked tower sections, wherein at least one tower section of the plurality of stacked tower sections comprises:
 a wall element comprising one or more printed layers formed of concrete; and
 a base supporting thereon the one or more printed layers;
 a fixed lift connection element for detachably engaging with a lifting device during stacking of the plurality of stacked tower sections, the fixed lift connection element integral to at least the wall element, the fixed lift connection element comprising a surface holding thereon the one or more printed layers of the wall element, wherein the base comprises a top side comprising a first alignment element and the wall element comprises a second alignment element, the first alignment element of the base aligning with the second alignment element of the wall element, wherein the second alignment element of the wall element is at least a top layer of the one or more printed layers, wherein the first alignment element of the base comprises a cavity receiving at least the top layer of the one or more printed layers of the wall element, and wherein at least the top layer of the one or more printed layers is a formed portion of the wall element, the cavity receiving the formed portion of the wall element.

16. The tower structure of claim 15, wherein the fixed lift connection element is a steel lifting plate integral to at least the wall element.

17. The tower structure of claim 16, wherein the steel lifting plate is integral to at least a bottom layer the one or more printed layers of the wall element.

18. A method of assembling a tower structure, the method comprising:
forming a mold of poured concrete or cast material;
forming a base of poured concrete or cast material, the base defining a top side having a first alignment element;
forming a plurality of tower sections using the mold; and
stacking the plurality of tower sections on top of the base to form the tower structure;
wherein forming the plurality of tower sections comprises:
printing and depositing one or more printed layers on a top side of the mold to form a wall element, the top side of the mold comprising an alignment mold such that the wall element printed and deposited thereon comprises a second an alignment element, the first alignment element of the base aligning with the second alignment element of the wall element, wherein the second alignment element of the wall element is at least a top layer of the one or more printed layers, wherein the first alignment element of the base comprises a cavity, and wherein at least the top layer of the one or more printed layers is a formed portion of the wall element; and
installing a lift connection element on the wall element;
wherein stacking the plurality of tower sections to form the tower structure comprises:
lifting, via the lift connection element, each of the plurality of tower sections;
aligning the first alignment element of the base with the second alignment element of the wall element; and
stacking the at least one tower section on the adjacent tower section by placing the formed portion of the wall element within the cavity of the first alignment element of the base.

19. The method of claim 18, wherein stacking the plurality of tower sections to form the tower structure further comprises capping the stacked plurality of tower sections using a cap section.

* * * * *